(12) United States Patent
Lee

(10) Patent No.: US 12,020,018 B2
(45) Date of Patent: Jun. 25, 2024

(54) SYSTEM AND METHOD FOR CONTROLLING UPDATE OF MOTOR-DRIVEN POWER STEERING SOFTWARE

(71) Applicant: HYUNDAI MOBIS CO., LTD., Seoul (KR)

(72) Inventor: Tae Hee Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 83 days.

(21) Appl. No.: 17/861,578

(22) Filed: Jul. 11, 2022

(65) Prior Publication Data
US 2023/0107998 A1 Apr. 6, 2023

(30) Foreign Application Priority Data

Oct. 6, 2021 (KR) .................. 10-2021-0132298
Oct. 6, 2021 (KR) .................. 10-2021-0132299

(51) Int. Cl.
*G06F 8/65* (2018.01)
*B62D 5/04* (2006.01)
*B62D 15/02* (2006.01)
*G06F 8/71* (2018.01)

(52) U.S. Cl.
CPC ............ *G06F 8/65* (2013.01); *B62D 5/046* (2013.01); *B62D 15/025* (2013.01); *G06F 8/71* (2013.01)

(58) Field of Classification Search
CPC .... G06F 8/60–66; B62D 5/046; B62D 15/025

USPC .................................... 717/168–178
See application file for complete search history.

(56) References Cited

U.S. PATENT DOCUMENTS

2020/0183676 A1\* 6/2020 Sakurai .................. H04L 67/34

FOREIGN PATENT DOCUMENTS

WO WO-2022214237 A1 \* 10/2022

OTHER PUBLICATIONS

Kim, Jae-Woo, et al., Development of Software Component Architecture for Motor-Driven Power Steering Control System using AUTOSAR Methodology, 15th International Conference on Control, Automation and Systems, 2015, 4 pages, [retrieved on Dec. 5, 2023] , Retrieved from the Internet: <URL:http://ieeexplore.ieee.org/>.\*

\* cited by examiner

*Primary Examiner* — Geoffrey R St Leger
(74) *Attorney, Agent, or Firm* — NSIP Law

(57) ABSTRACT

Disclosed are a system and method for controlling the update of software of a motor-driven power steering (MDPS) apparatus, the system includes a central communication controller configured to download the latest version of new SW through wireless communication with a server outside a vehicle and an MDPS controller including a first memory in which an old version of SW has been stored and a second memory and configured to download the new SW from the central communication controller, store the new SW in the second memory, and perform the update of the new SW by swapping the first memory and the second memory.

20 Claims, 16 Drawing Sheets

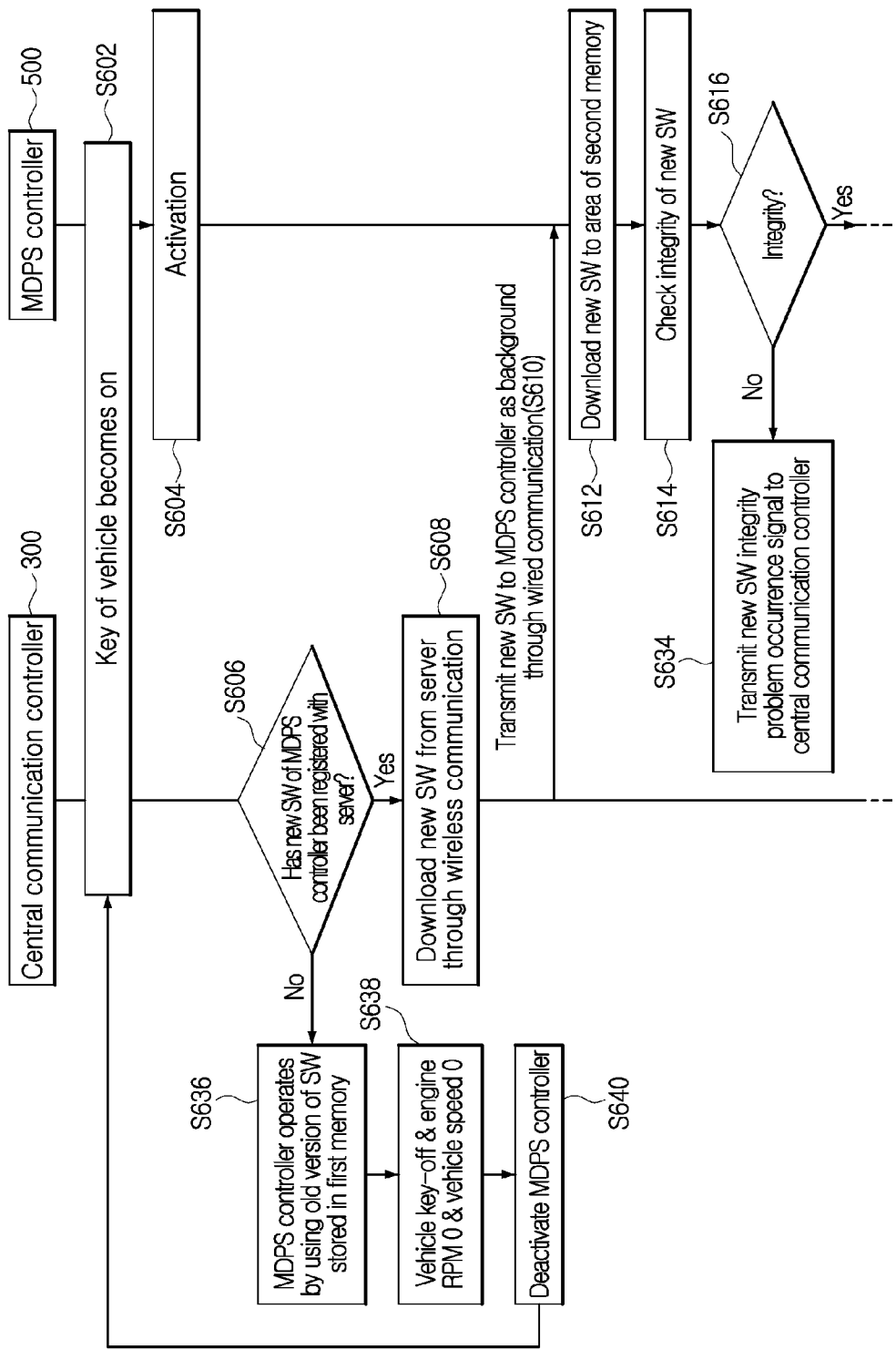

SYSTEM AND METHOD FOR CONTROLLING UPDATE OF MOTOR-DRIVEN POWER STEERING SOFTWARE

CROSS-REFERENCE TO RELATED APPLICATIONS

This application claims the benefit under 35 USC § 119(a) of Korean Patent Application No. 10-2021-0132298 and 10-2021-0132299, filed on Oct. 6, 2021, the entire disclosure of which is incorporated herein by reference for all purposes.

BACKGROUND

Field

Exemplary embodiments of the present disclosure relate to a system and method for controlling the update of software (SW) of a motor-driven power steering (MDPS) apparatus, and more particularly, to a system and method for controlling the update of SW of an MDPS apparatus, which enable SW of an MDPS controller to be updated based on a driver's confirmation that is remotely received even in the state in which the key of a vehicle has been off when the update of SW according to the improvement of an important function or a campaign/recall is urgently necessary in a vehicle that supports vehicle communication wakeup.

Description of Related Art

In general, a hydraulic power steering apparatus using hydraulic pressure of a hydraulic pump is used as an assistant power steering apparatus for a vehicle. However, after the 1990s, a motor-driven power steering (MDPS) apparatus using an electric motor gradually becomes generalized.

The existing hydraulic power steering apparatus always consumes energy regardless of whether steering wheels are rotated because a hydraulic pump, that is, a power that assists electric power, is driven by an engine. In contrast, in the MDPS apparatus, a motor driven by electric energy provides steering-assistant power when torque is generated by the rotation of steering wheels. Accordingly, if the MDPS apparatus is used, there is an advantage in that energy efficiency of a vehicle can be improved compared to the hydraulic power steering apparatus.

As the supply of electric vehicles is increased, a software update method of an over the air (OTA) method is used in order to subsequently perform the update of SW of an electronic control unit (ECU) for various electrical components of a vehicle. It is expected that the software update method will be further increased subsequently.

Accordingly, an MDPS apparatus (e.g., MDPS or EPS) wirelessly downloads the latest version of SW from a server through a central communication controller having a vehicle level, and performs updates on the downloaded latest SW through a wired communication channel (e.g., CAN or CAN-FD) within the vehicle at designated timing (e.g., while driving or key-off timing).

For example, conventionally, if software (SW) of an MDPS apparatus (MDPS or EPS) controller requires a SW update action according to the improvement of an important function or a campaign/recall, after the key of a vehicle is on, a method of confirming, by the central communication controller, a new SW update through the server and primarily downloading new SW on the central communication controller while driving, and updates an individual MDPS controller with the downloaded new SW through a wired communication channel at key-off timing is used.

Such a conventional method has problems in that a vehicle operation (or steering) has to be performed based on the existing old version of SW until the update of new SW and that there is a possibility that a driver may be exposed to an accident due to a problematic old version of SW.

Furthermore, an MCU mounted on an MDPS controller needs to download new SW through a wired communication channel for a long time after a key-off because the MCU has one memory capable of storing/driving SW. In this case, there is a problem in that the probability that the update of new SW of the MDPS controller may fail is increased because the new SW needs to be downloaded through a wired communication channel for several minutes and the MDPS controller has to perform/confirm the SW updates in a situation in which battery power and a communication state of a vehicle are unstable (e.g., a situation in which battery power has to be consumed without supplying stable vehicle power according to the driving of an engine). In this case, there is a possibility that a driver may be additionally exposed to an accident due to problematic old version of SW, and there is a problem in that a lot of a battery current is consumed because SW updates have to be performed for several minutes at vehicle key-off timing.

The background technology of the present disclosure is disclosed in Korean Patent No. 10-0247334 (Dec. 10, 1999) entitled "MOTOR DRIVEN POWER STEERING DEVICE."

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a system for controlling an update of software (SW) of a motor-driven power steering (MDPS) apparatus, the system including a central communication controller configured to download a new version of the SW through wireless communication with a server located outside a vehicle, and an MDPS controller including a first memory configured to store an old version of the SW and a second memory configured to store the new version of the SW, and the MDPS controller being configured to download the new version of the SW from the central communication controller and to perform an update of the new version of the SW by swapping the first memory and the second memory, wherein the MDPS controller includes a communication transceiver connected to the central communication controller through wired communication and configured to receive the new version of the SW from the central communication controller and store the new version of the SW in the second memory, a logic circuit unit configured to output a signal to turn on or off an operation of a power management unit based on any one or any combination of a vehicle key-on/off signal, a latch signal, and a first control signal from the communication transceiver, the power management unit configured to be activated, in response to receiving an operation-on signal from the logic circuit unit and being configured to supply driving power to a micro control unit (MCU) and to control an on or off of the latch signal, and the MCU including the first memory and the second memory and being configured to perform the update of the new version of the SW by swapping the first memory and the second memory.

In response to the new version of the SW of the MDPS controller being updated in a state in which the vehicle is in a key-off state and a user of the vehicle is not present in the vehicle, the server may be configured to notify a designated terminal of the user of the new version of the SW, and transmit a SW update command to the central communication controller, in response to receiving an update approval command from the user.

The logic circuit unit may be implemented by an OR gate.

In response to a state of the vehicle being a key-on state, the MDPS controller may be activated by the vehicle key-on signal, and the central communication controller may be configured to determine whether new version of the SW of the MDPS controller has been registered with the server, download the new version of the SW from the server through wireless communication, in response to the new version of the SW having been registered with the server, and to transmit the new version of the SW to the MDPS controller through the wired communication.

In another general aspect, there is provided a processor-implemented method of controlling an update of software (SW) of a motor-driven power steering (MDPS) apparatus, the method including notifying, by a server, a terminal of the user of software update information, in response to new SW of an MDPS controller being available with a vehicle being in a key-off state and a user not being present in the vehicle, transmitting a SW update command to a central communication controller, in response to receiving an update approval command from the user, transmitting, by the central communication controller, a wakeup signal to the MDPS controller through wired communication, activating the MDPS controller based on power supplied, in response to the wakeup signal, transmitting, by the MDPS controller, a preparation-completed state message to the central communication controller, downloading, by the central communication controller, the new SW from the server through wireless communication and transmitting the new SW to the MDPS controller through wired communication, downloading, by the MDPS controller, the new SW to a second memory in which an old version of SW has not been stored and performing the update of the new SW by swapping a first memory in which an old version of SW has been stored and the second memory, and transmitting, by the MDPS controller, a new software update-completed signal to the central communication controller through wired communication and operating in a sleep mode, in response to the update of the new SW being completed.

The transmitting of the wakeup signal to the MDPS controller may include checking, by the central communication controller, a voltage state of a battery of the vehicle and transmitting the wakeup signal to the MDPS controller through wired communication, in response to a voltage of the battery being greater than or equal to a threshold.

The transmitting of the preparation-completed state message to the central communication controller may include turning on, by a communication transceiver of the MDPS controller, a first switch connected to a battery, in response to receiving the wakeup signal from the central communication controller, being activated by power supplied from the battery, turning on a second switch connected to a logic circuit unit, and transmitting a first control signal for activating a power management unit to the logic circuit unit, transmitting, by the logic circuit unit, a power management unit operation-on signal to the power management unit, in response to receiving the first control signal, supplying, by the power management unit, driving power to a micro control unit (MCU), in response to being activated by the operation-on signal, activating the MCU by the driving power, and transmitting, by the MCU, a latch signal control-on command to the power management unit through SPI communication to continuously receive the power even when the MCU is reset, and a preparation-completed state message to the central communication controller through the communication transceiver.

The performing of the update of the new SW may include configuring an MCU to download the new SW from the central communication controller to the second memory through a communication transceiver, check an integrity of the downloaded new SW, change an area of a main memory from the first memory to the second memory, in response to the integrity of the new SW being verified, and determine whether the new SW operates normally by performing initialization.

In another general aspect, there is provided a processor-implemented method of controlling an update of software (SW) of a motor-driven power steering (MDPS) apparatus, the method including activating an MDPS controller by a key-on signal, in response to a state of a vehicle being a key-on state, determining, by a central communication controller, whether new SW of the MDPS controller has been registered with a server, downloading the new SW from the server through wireless communication in response to the new SW being registered with the server, and transmitting the new SW to the MDPS controller through wired communication, downloading, by the MDPS controller, the new SW to a second memory in which an old version of SW has not been stored and checking updatable timing of the new SW, in response to an integrity of the new SW being verified, performing, by the MDPS controller, an update of the new SW by swapping a first memory in which an old version of SW is stored and the second memory, in response to the updatable timing of the new SW being reached, and transmitting, by the MDPS controller, a new software update-completed signal to the central communication controller through wired communication and operating in a sleep mode, in response to the update of the new SW being completed.

The activating of the MDPS controller by the key-on signal may include a logic circuit unit of the MDPS controller transmits a power management unit operation-on signal to a power management unit, in response to receiving a vehicle key-on signal, activating the power management unit by the operation-on signal and supplying driving power to a micro control unit (MCU), and activating the MCU by the supplied driving power, transmitting a latch signal control-on command to the power management unit through SPI communication to continuously receive the power even when the MCU is reset, and activating a communication transceiver.

The transmitting of the new SW to the MDPS controller through the wired communication may include transmitting, by the central communication controller, the new SW to the MDPS controller based on a wired communication network and a load factor of an MCU of the MDPS controller.

The checking of the updatable timing of the new SW may include determining, by the MDPS controller, corresponding timing as the updatable timing of the new SW in response to a software-updatable condition may include at least one of a key-off state of the vehicle, an engine RPM "0", a vehicle speed "0", or a reception of an update approval command from a user is satisfied.

In another general aspect, there is provided a system for controlling an update of software (SW) of a motor-driven power steering (MDPS) apparatus, the system including a central communication controller configured to download a new version of the SW through wireless communication with a server located outside a vehicle in response to a state of the vehicle being a key-on state and to transmit the new SW to a motor-driven power steering (MDPS) controller through wired communication, and the MDPS controller including a first memory configured to store an old version of the SW and a second memory configured to store the new version of the SW received from the central communication controller and perform an update of the new version of the SW by swapping the first memory and the second memory at updatable timing of the new SW, wherein the MDPS controller includes a communication transceiver connected to the central communication controller through wired communication and configured to receive the new version of the SW from the central communication controller and to store the new version of the SW in the second memory, a logic circuit unit configured to output a signal to turn on or off an operation of a power management unit based on any one or any combination of a vehicle key-on/off signal and a latch signal, the power management unit configured to be activated, in response to receiving an operation-on signal from the logic circuit unit and being configured to supply driving power to a micro control unit (MCU) and to control an on or off of the latch signal, and the MCU including the first memory and the second memory and being configured to perform the update of the new version of the SW by swapping the first memory and the second memory at the updatable timing of the new SW.

The central communication controller may be configured to determine whether new version of the SW of the MDPS controller has been registered with the server, downloads the new version of the SW from the server through wireless communication if the new version of the SW has been registered with the server, and transmits the new version of the SW to the MDPS controller as a background through wired communication.

The logic circuit unit may be configured to transmit a power management unit operation-on signal to the power management unit, in response to receiving the vehicle key-on signal or the latch signal "on" from the power management unit, and the power management unit may be configured to be activated by the operation-on signal and to supply the driving power to the MCU, and, when receiving a latch signal control-on command from the MCU, transmits the latch signal "on" to the logic circuit unit to maintain an activation of the MDPS controller even though the key of the vehicle becomes off or the MCU is reset.

The central communication controller or the MDPS controller are further configured to determine corresponding timing as the updatable timing of the new version of the SW, in response to a software-updatable condition may include at least one of a key-off state of the vehicle, an engine RPM being "0", a vehicle speed being "0", or a reception of an update approval command from a user is satisfied.

In another general aspect, there is provided a processor-implemented method of controlling an update of software (SW) of a motor-driven power steering (MDPS) apparatus, the method including activating an MDPS controller by a key-on signal, in response to a state of a vehicle being a key-on state, determining, by a central communication controller, whether new SW of the MDPS controller has been registered with a server, downloading the new SW from the server through wireless communication in response to the new SW having been registered with the server, and transmitting the new SW to the MDPS controller through wired communication, downloading, by the MDPS controller, the new SW to a second memory in which an old version of the SW has not been stored and verifying an integrity of the downloaded new SW, performing, by the MDPS controller, an update of the new SW by swapping a first memory in which an old version of the SW is stored and the second memory, in response to the integrity of the new SW being verified and updatable timing of the new SW being reached, and transmitting, by the MDPS controller, a new software update-completed signal to the central communication controller through wired communication and operating in a sleep mode, in response to the update of the new SW being completed.

The activating of the MDPS controller by the key-on signal may include transmitting, by a logic circuit unit of the MDPS controller, a power management unit operation-on signal to a power management unit, in response to receiving a vehicle key-on signal, activating the power management unit by the operation-on signal and supplying driving power to a micro control unit (MCU), and activating the MCU by the supplied driving power, and transmitting a latch signal control-on command to the power management unit through SPI communication to continuously receive the power even though the key of the vehicle becomes off or the MCU is reset.

The transmitting of the new SW to the MDPS controller through the wired communication may include transmitting, by the central communication controller, the new SW to the MDPS controller as a background by considering a wired communication network and a load factor of the MCU within the MDPS controller.

The performing of the update of the new SW may include determining, by the MDPS controller, corresponding timing as the updatable timing of the new SW, in response to a software-updatable condition may include at least one of a key-off state of the vehicle, an engine RPM "0", a vehicle speed "0", or a reception of an update approval command from a user being satisfied.

Other features and aspects will be apparent from the following detailed description, the drawings, and the claims.

BRIEF DESCRIPTION OF THE DRAWINGS

FIGS. 6A and 6B are diagrams for describing a method of controlling the update of SW of the MDPS apparatus in the key-on state of a vehicle according to an embodiment of the present disclosure.

Figure 1:
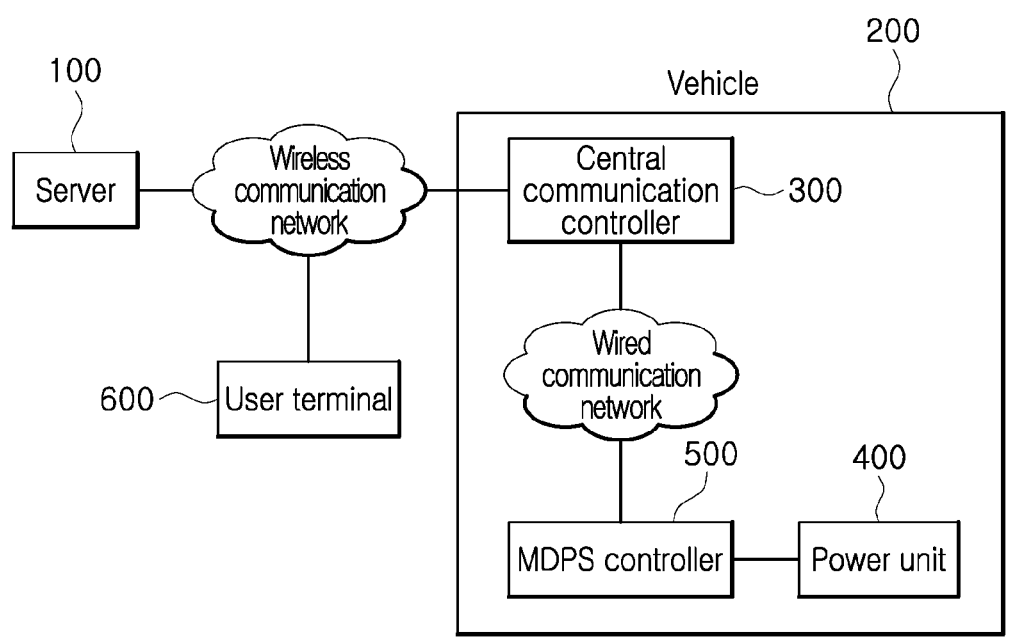
FIG. 1 is a diagram for describing a system for controlling the update of SW of an MDPS apparatus according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF THE ILLUSTRATED EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third," A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Furthermore, an implementation described in this specification may be realized as a method or process, an apparatus, a software program, a data stream or a signal, for example. Although the present disclosure has been discussed only in the context of a single form of an implementation (e.g., discussed as only a method), an implementation having a discussed characteristic may also be realized in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example. The processor includes a communication device, such as a computer, a cell phone, a mobile phone/personal digital assistant ("PDA") and another device which facilitates the communication of information between end-users.

FIG. 1 is a diagram for describing a system for controlling the update of SW of a motor-driven power steering (MDPS) apparatus according to an embodiment of the present disclosure.

Referring to FIG. 1, the system for controlling the update of SW of the MDPS apparatus according to an embodiment of the present disclosure includes a server 100 and a user terminal 600 provided outside a vehicle and an MDPS software (SW) update apparatus 200 provided within the vehicle.

The server 100 stores a SW update version for each of multiple electronic control units (ECUs) included in the vehicle, and may also store information on ECUs included in the vehicle based on vehicle information. In particular, the server 100 may store SW of an MDPS controller 500.

For example, the server 100 may provide new SW necessary to perform a software update on the MDPS controller 500 by transmitting the new SW to the MDPS SW update apparatus 200 by using an over the air (OTA) method in response to a request from the MDPS SW update apparatus 200 or when a preset given condition is satisfied. In this case, the OTA method may be a method of wirelessly distributing new SW.

If a state of the vehicle is a key-off state and SW of the MDPS controller 500 is updated with new SW in the state in which a user of the vehicle has left the vehicle, the server 100 may notify, of SW update information, the designated terminal 600 of the user, and may transmit a SW update command to a central communication controller 300 when receiving an update approval command from the user.

A wireless communication network for data transmission between the MDPS SW update apparatus 200 and the server 100 may include a global system for mobile communication (GSM), code division multi access (CDMA), code division multi access 1000 (CDMA1000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), etc, but the present disclosure is not limited thereto.

The MDPS SW update apparatus 200 is included in within the vehicle, and it may wirelessly download the latest SW version from the server 100 and may update the MDPS controller 500 with the downloaded new SW through the existing wired communication channel (e.g., CAN or CAN-FD).

Specifically, when a SW update action according to the improvement of an important function or a campaign/recall is urgently necessary in a vehicle that supports vehicle communication wakeup, SW of the MDPS SW update apparatus 200 may be urgently updated with new SW through the user terminal 600 at key-off timing at which a driver has not gotten into the vehicle. In this case, the user terminal 600 may be a desktop computer, a smartphone, a notebook, a tablet PC, smart TV, a mobile phone, a personal digital assistant (PDA), a laptop, a media player, a micro server, a global positioning system (GPS) apparatus, an E-book terminal, a digital broadcasting terminal, a device for navigation, a kiosk, an MP3 player, a digital camera, home appliances, or another mobile or non-mobile computing device, which has a wireless communication function and is manipulated by a user, but the present disclosure is not limited thereto.

Furthermore, if a SW update action according to the improvement of an important function or a campaign/recall is not performed at key-off timing, SW of the MDPS SW update apparatus 200 may be updated with new SW after the key on of the vehicle, and may provide a safe steering function by the improved new SW at next key-on timing.

The MDPS SW update apparatus 200 may include the central communication controller 300, a power unit 400, and the MDPS controller 500.

The central communication controller 300 may wirelessly download the latest SW version from the server 100, and may update the MDPS controller 500 with the downloaded new SW through the existing wired communication channel (e.g., CAN or CAN-FD).

The power unit 400 is a main power source of the vehicle, and includes a battery power source.

The MDPS controller 500 is the subject of a SW update, and may include a plurality of memories capable of storing and driving SW. Hereinafter, a case where the MDPS controller 500 includes a dualized memory of a first memory 544 and a second memory 546, the first memory 544 stores an old version of SW and the second memory 546 stores new SW is limited and described for convenience of description. The MDPS controller 500 may download new SW from the central communication controller 300, may store the new SW in the second memory 546, and may perform the update of the new SW by swapping the first memory 544 in which an old version of SW has been stored and the second memory 546.

The MDPS SW update apparatus 200 may have a different method of updating SW of the MDPS controller 500 depending on a key-on or key-off state of the vehicle.

First, a case where SW of the MDPS controller 500 is updated in the key-off state of a vehicle is described.

When a state of the key of the vehicle is the off state, the central communication controller 300 may check a battery voltage state of the vehicle when receiving a SW update command from the server 100, may transmit a wakeup signal to the MDPS controller 500 through wired communication in order to activate the MDPS controller 500 when a voltage of the battery 400 is a preset voltage or more, may download new SW from the server 100 through wireless communication when receiving a preparation-completed state message from the MDPS controller 500, and may transmit the downloaded new SW to the MDPS controller 500 through wired communication.

The MDPS controller 500 may be activated by being supplied with power from the power unit 400 when receiving the wakeup signal from the central communication controller 300, may transmit the preparation-completed state message to the central communication controller 300, may download, to an area of the second memory 546, the new SW from the central communication controller 300, may check the integrity of the downloaded new SW, may change an area of a main memory from the first memory 544 to the second memory 546 if the integrity of the new SW is verified, may determine whether the new SW operates normally by performing the initialization of a micro control unit (MCU) 540, may transmit a new SW update-completed signal to the central communication controller 300 when the new SW operates normally, and may operate in a normal sleep mode. When the update of the new SW is terminated, the MDPS controller 500 may switch to a sleep mode.

As described above, SW of a vehicle that supports vehicle communication wakeup can be updated with corresponding new SW when a SW update action according to the improvement of an important function or a campaign/recall is urgently necessary even in the key-off state, and can finish related actions prior to the key on of the vehicle in which a driver is actually gotten. Accordingly, a danger of a driver and a passenger being exposed to an accident attributable to old version of SW can be reduced.

Next, a case where SW of the MDPS controller 500 is updated in the key-on state of a vehicle is described.

When a state of the vehicle is a key-on state, the central communication controller 300 may determine whether new SW of the MDPS controller 500 has been registered with the server 100, may download the new SW from the server 100 through wireless communication if the new SW has been registered with the server 100, and may transmit the downloaded new SW to the MDPS controller 500 as a background through wired communication.

The MDPS controller 500 may download, to the second memory 546, the new SW received from the central communication controller 300, may check the integrity of the downloaded new SW, may check updatable timing of the downloaded new SW if the integrity of the new SW is verified, may change an area of a main memory from the first memory 544 to the second memory 546 when the updatable timing of the new SW is reached, may determine whether the new SW operates normally by performing the initialization of the MCU 540, may transmit a new SW update-completed signal to the central communication controller 300 when the new SW operates normally, and may operate in the normal sleep mode. When the update of the new SW is terminated, the MDPS controller 500 may switch to the sleep mode.

The possibility that a driver may be exposed to a danger can be reduced by updating new SW after the key-on of a vehicle even though the update of the new SW is not performed at key-off timing and providing a safe steering function by the improved new SW at next key-on timing as described above.

The MDPS controller 500 is described in detail with reference to FIGS. 2 and 3.

Figure 2:
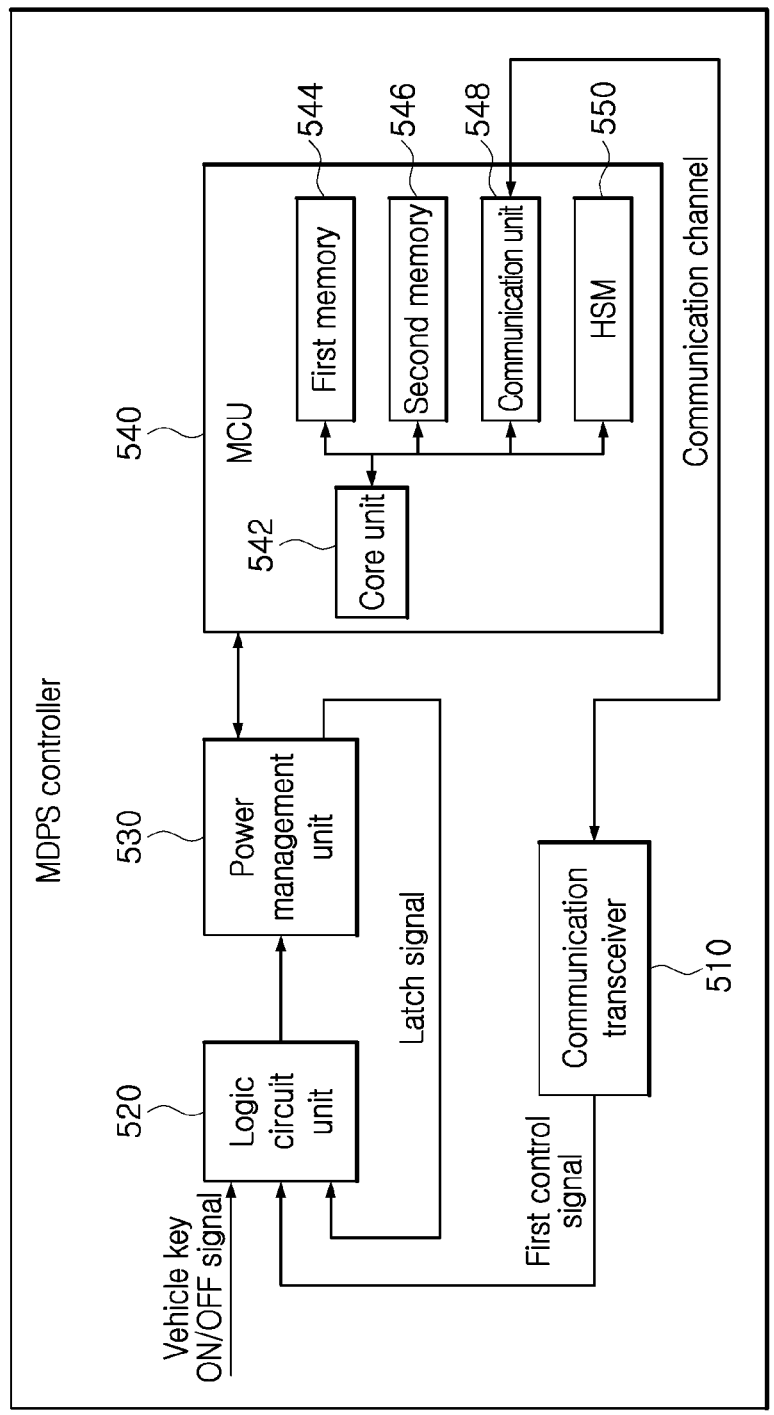
FIGS. 2 and 3 are block diagrams illustrating a configuration of an MDPS controller according to an embodiment of the present disclosure.
Figure 3:
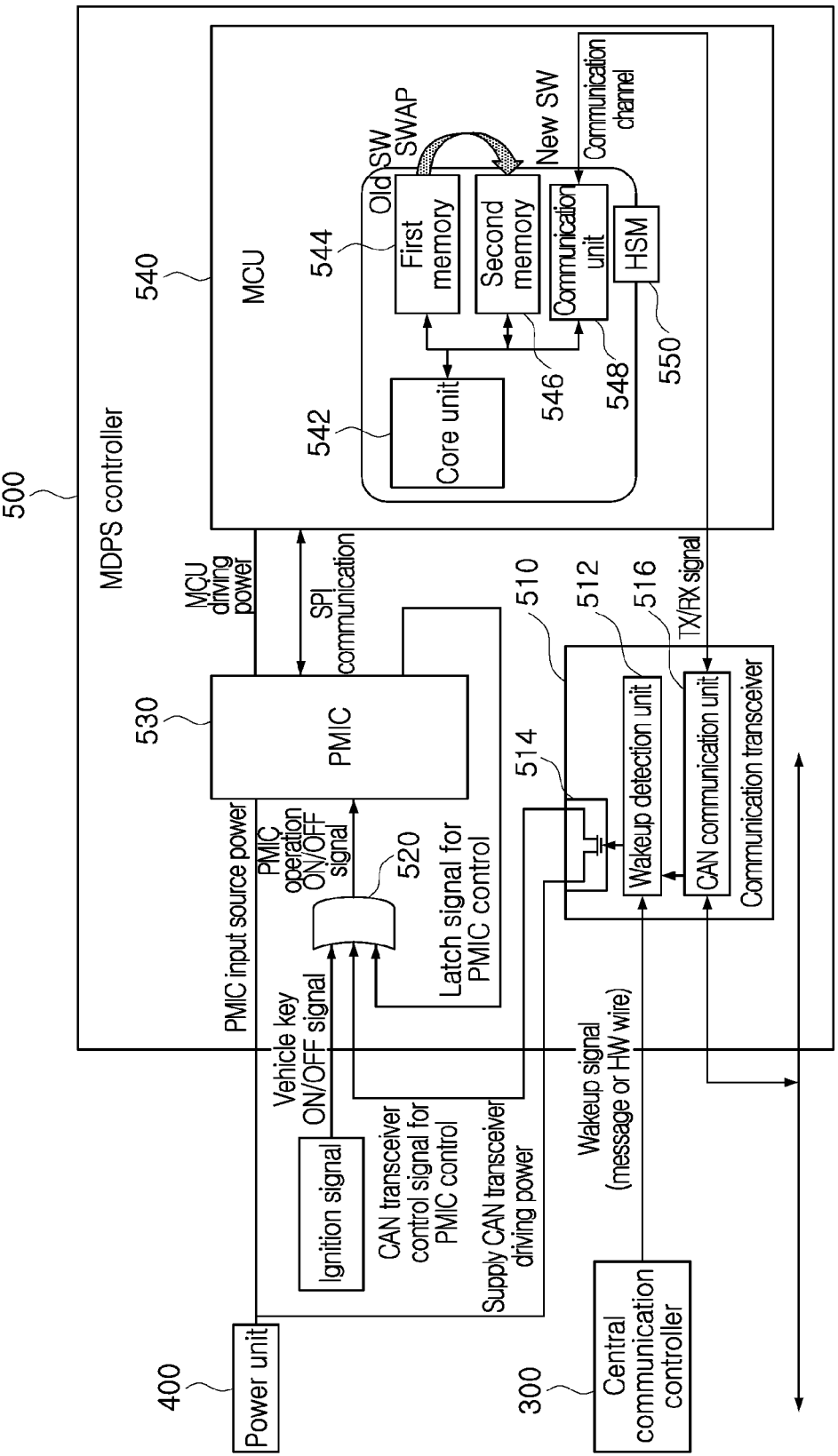

FIGS. 2 and 3 are block diagrams illustrating a configuration of an MDPS controller according to an embodiment of the present disclosure.

Referring to FIGS. 2 and 3, the MDPS controller 500 according to an embodiment of the present disclosure may include a communication transceiver 510, a logic circuit unit 520, a power management unit 530, and an MCU 540.

The communication transceiver 510 may be connected to the central communication controller 300 through wired communication, and may receive new SW from the central communication controller 300.

The communication transceiver 510 may include a wakeup detection unit 512, a switch unit 514, and a CAN communication unit 516.

The wakeup detection unit 512 may be a configuration for detecting a wakeup signal. When detecting a wakeup signal, the wakeup detection unit 512 may wake the communication transceiver 510 up from the sleep mode, and may be supplied with power from the power unit 400 by turning on a first switch connected to the power unit 400 (e.g., a battery). Furthermore, the wakeup detection unit 512 may turn on a second switch connected to the logic circuit unit 520 simultaneously with waking the communication transceiver 510 up, and may output a first control signal (a CAN transceiver control signal for a power management integrated circuit (PMIC)) for activating the power management unit 530.

The CAN communication unit 516 is a configuration for providing wired communication with the central communication controller 300, and may download new SW from the central communication controller 300 and transmit the downloaded new SW to the second memory 546 through a communication unit 548 of the MCU 540. Furthermore, the CAN communication unit 516 may provide communication between the MCU 540 and the central communication controller 300.

The logic circuit unit 520 may output a power management unit operation-on signal (PMIC operation-on signal) to turn on an operation of the power management unit 530 based on at least one of a vehicle key-on/off signal (i.e., an ignition signal), a first control signal, and a latch signal. In this case, the logic circuit unit 520 is a gate circuit that operates as OR logic, and may output a power management unit operation-on signal based on an OR combination of the vehicle key-on signal, the first control signal, and the latch signal. For example, when receiving at least one of the vehicle key-on signal, the first control signal, and the latch signal "on", the logic circuit unit 520 may output the power management unit operation-on signal. Furthermore, when receiving the vehicle key-off signal and the latch signal "off", the logic circuit unit 520 may output a power management unit operation-off signal.

The power management unit 530 may be activated when receiving an operation-on signal from the logic circuit unit 520, and may supply driving power to the MCU 540.

Furthermore, the power management unit 530 may apply, to the logic circuit unit 520, a latch signal capable of continuously supplying power to the MCU 540. At this time, if power has to be continuously supplied to the MCU 540 (i.e., when receiving a latch signal control-on command from the MCU 540), the power management unit 530 may transmit the latch signal "on" to the logic circuit unit 520. Furthermore, if power does not need to be continuously supplied to the MCU 540, (i.e., when receiving a latch signal control-off command from the MCU 540), the power management unit 530 may transmit a latch signal "off" to the logic circuit unit 520.

That is, after the self-reset of the MCU 540, the MCU 540 needs to be continuously supplied with power because the MCU 540 has to continue to operate and perform a subsequent task (e.g., a task for checking whether SW has been updated with new SW normally and transmitting a result of the check to the central communication controller 300). Accordingly, the power management unit 530 controls the latch signal capable of continuously supplying power to the MCU 540, so the MCU 540 can be continuously supplied with power after the self-reset of the MCU 540. The power management unit 530 may be implemented as a power management IC (PMIC), etc. The PMIC may be an IC which synthetically performs a regulator function for receiving battery power (12 V or 24 V) and converting the power into a 5 V/3.3 V level which may be used in the MDPS controller 500 and a function for controlling the ON/OFF of several regulators embedded therein in response to a command received from the MCU 540 through SPI communication and performing trouble shooting.

The MCU 540 may include a dualized memory of the first memory 544 and the second memory 546. The MCU 540 may be activated by being supplied with driving power from the power management unit 530, and may transmit a latch signal control-on command to the power management unit 530 through SPI communication in order to be continuously supplied with power even after the self-reset of the MCU 540. When receiving the latch signal control-on command, the power management unit 530 may continuously supply power to the MCU 540 by transmitting the latch signal to the logic circuit unit 520.

Furthermore, the MCU 540 may download new SW from the central communication controller 300 through the CAN communication unit 516, may store the new SW in the second memory 546 in which an old version of SW has not been stored, and may perform the update of the new SW by swapping the first memory 544 and the second memory 546.

The MCU 540 may include a core unit 542, the first memory 544, the second memory 546, the communication unit 548, and an HSM 550.

The communication unit 548 may form a communication channel between the MCU 540 and the communication transceiver 510 while operating in conjunction with the CAN communication unit 516.

The core unit 542 is a configuration for controlling operations of various components of the MCU 540, may activate the MCU 540 when driving power is supplied by the power management unit 530, and may transmit a latch signal control-on command to the power management unit 530.

Furthermore, when receiving new SW through the communication unit 548, the core unit 542 may download the new SW to the second memory 546 in which an old version of SW has not been stored, and may check the integrity of the new SW downloaded to the second memory 546.

Furthermore, if the integrity of the new SW is verified, the core unit 542 may change an area of a main memory from the first memory 544 to the second memory 546, may determine whether the new SW operates normally by performing the initialization of the MCU 540, and may transmit a new SW update-completed signal to the central communication controller 300 through the communication unit 548 and the communication transceiver 510 when the new SW operates normally. In this case, the first memory 544 and the second memory 546 may include non-volatile memories, such as a flash memory, a read only memory (ROM), an erasable programmable read only memory (EPROM), and an electrically erasable programmable read only memory (EEPROM). In particular, the first memory 544 and the second memory 546 may include a memory on which read/write can be repeated among non-volatile memories.

Furthermore, when the update of the new SW is completed, the core unit 542 may control the MCU 540 to operate in the normal sleep mode by deactivating the communication transceiver 510 and transmitting a latch signal control-off command to the power management unit 530. In this case, the power management unit 530 that has received the latch signal control-off command may block the power supplied to the MCU by transmitting a latch signal "off" to the logic circuit unit. As described above, when power supplied to the MCU is blocked, the MDPS controller 500 may operate in the normal sleep mode.

Figure 4A:
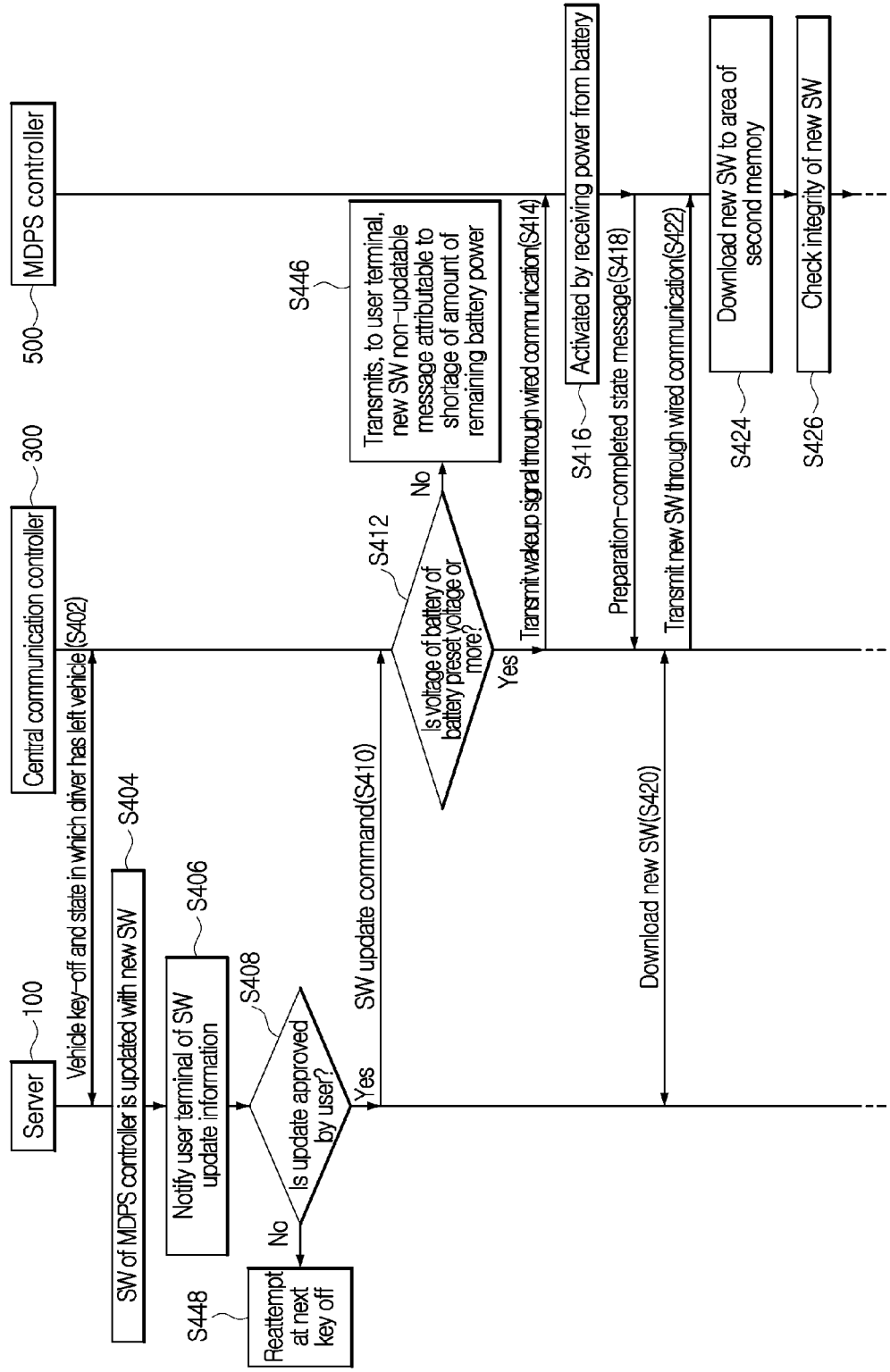
FIGS. 4A and 4B are diagrams for describing a method of controlling the update of SW of the MDPS apparatus in the key-off state of a vehicle according to an embodiment of the present disclosure.
Figure 4B:
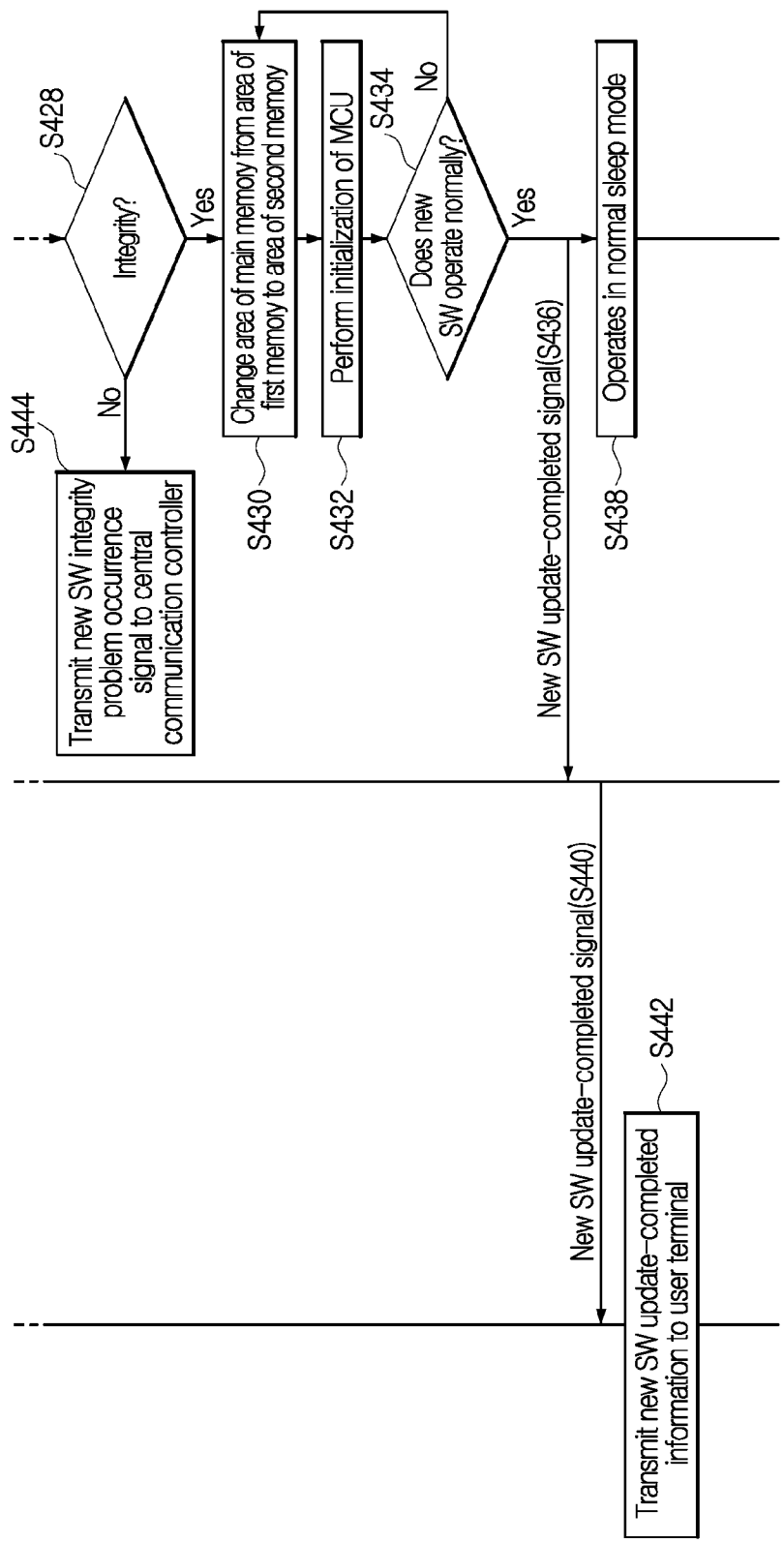

FIGS. 4A and 4B are diagrams for describing a method of controlling the update of SW of the MDPS apparatus in the key-off state of a vehicle according to an embodiment of the present disclosure.

Referring to FIGS. 4A and 4B, when a current state of the vehicle is the key-off state and in the state in which a driver (i.e., a user) has left the vehicle (S402), when SW of the MDPS controller 500 is updated with new SW (S404), the server 100 notifies, of SW update information, the designated terminal 600 of the user (S406), and determines whether an update approval command is received from the user (S408).

When the update approval command is received from the user as a result of the determination in step S408, the server 100 transmits a SW update command to the central communication controller 300 (S410). In this case, the server 100 may notify, of only the SW update information, the designated terminal 600 of the user according to a pre-designated option, and may directly transmit the SW update command to the central communication controller 300 without requesting the permission of the user.

The central communication controller 300 that has received the SW update command determines whether a voltage of the battery 400 is a preset voltage or more by checking a battery voltage state of the vehicle (S412).

When the voltage of the battery is not the reference voltage or more as a result of the determination in step S412, the central communication controller 300 transmits, to the user terminal 600, a new SW non-updatable message attributable to the shortage of the amount of remaining battery power (S446).

When the voltage of the battery is the reference voltage or more as a result of the determination in step S412, the central communication controller 300 transmits a wakeup signal to the MDPS controller 500 through wired communication in order to activate the MDPS controller 500 (S414).

The MDPS controller 500 that has received the wakeup signal is activated by being supplied with power from the battery 400 (S416), and transmits a preparation-completed state message to the central communication controller 300 (S418). That is, when receiving the wakeup signal, the MDPS controller 500 may wake up from the sleep mode and may become an activated state.

When step S418 is performed, the central communication controller 300 downloads the new SW from the server 100 through wireless communication (S420), and transmits the downloaded new SW to the MDPS controller 500 through wired communication (S422). In this case, after completing the download of the new SW, the central communication controller 300 may transmit the new SW to the MDPS controller 500. Furthermore, the central communication controller 300 may transmit the new SW to the MDPS controller 500 in real time while downloading the new SW from the server 100.

The MDPS controller 500 downloads, to the second memory 546 in which an old version of SW has not been stored, the new SW received from the central communication controller 300 through wired communication (S424). In this case, the first memory 544 may be in the state in which an old version of SW for operating the MDPS controller 500 has been stored in the first memory 544.

When performing step S424, the MDPS controller 500 verifies the integrity of the new SW (S428) by checking the integrity of the downloaded new SW (S426). In this case, the MDPS controller 500 may check the integrity (error) of the new SW by using a checksum, etc. The download and integrity (error) check of the new SW may be repeatedly performed until the update of the new SW is successfully completed, and the user terminal 600 may be notified of a situation according to a preset option.

When the integrity of the new SW is not verified in step S428, the MDPS controller 500 transmits a new SW integrity problem occurrence signal to the central communication controller 300 (S444). Accordingly, the central communication controller 300 may perform step S420 again.

When the integrity of the new SW is verified in step S428, the MDPS controller 500 changes an area of a main memory from the first memory 544 to the second memory 546 in which the new SW has been stored (S430), and performs the initialization of the MCU 540 (S432). The MDPS controller 500 may perform self-reset within the MCU 540 in order to incorporate a portion in which an area of a main memory from the first memory 544 to the second memory 546.

After performing step S432, the MDPS controller 500 determines whether the new SW operates normally (S434).

When the new SW operates normally as a result of the determination in step S434, the MDPS controller 500 transmits a new SW update-completed signal to the central communication controller 300 through wired communication (S436), and operates in the normal sleep mode (S438). That is, when the update of the new SW is completed, the MDPS controller 500 may be deactivated.

The central communication controller 300 that has received the new SW update-completed signal transmits a new SW update-completed signal to the server 100 (S440). The server 100 transmits new SW update-completed information to the user terminal 600 (S442).

When not receiving an update approval command from the user as a result of the determination in step S408, the server 100 notifies the user terminal 600 of the SW update information upon next key-off (S448).

As described above, the present embodiment has an effect in that a user can update SW of the MDPS apparatus for a vehicle even in the state in which the key of the vehicle has been off without getting into the vehicle.

Figure 5A:
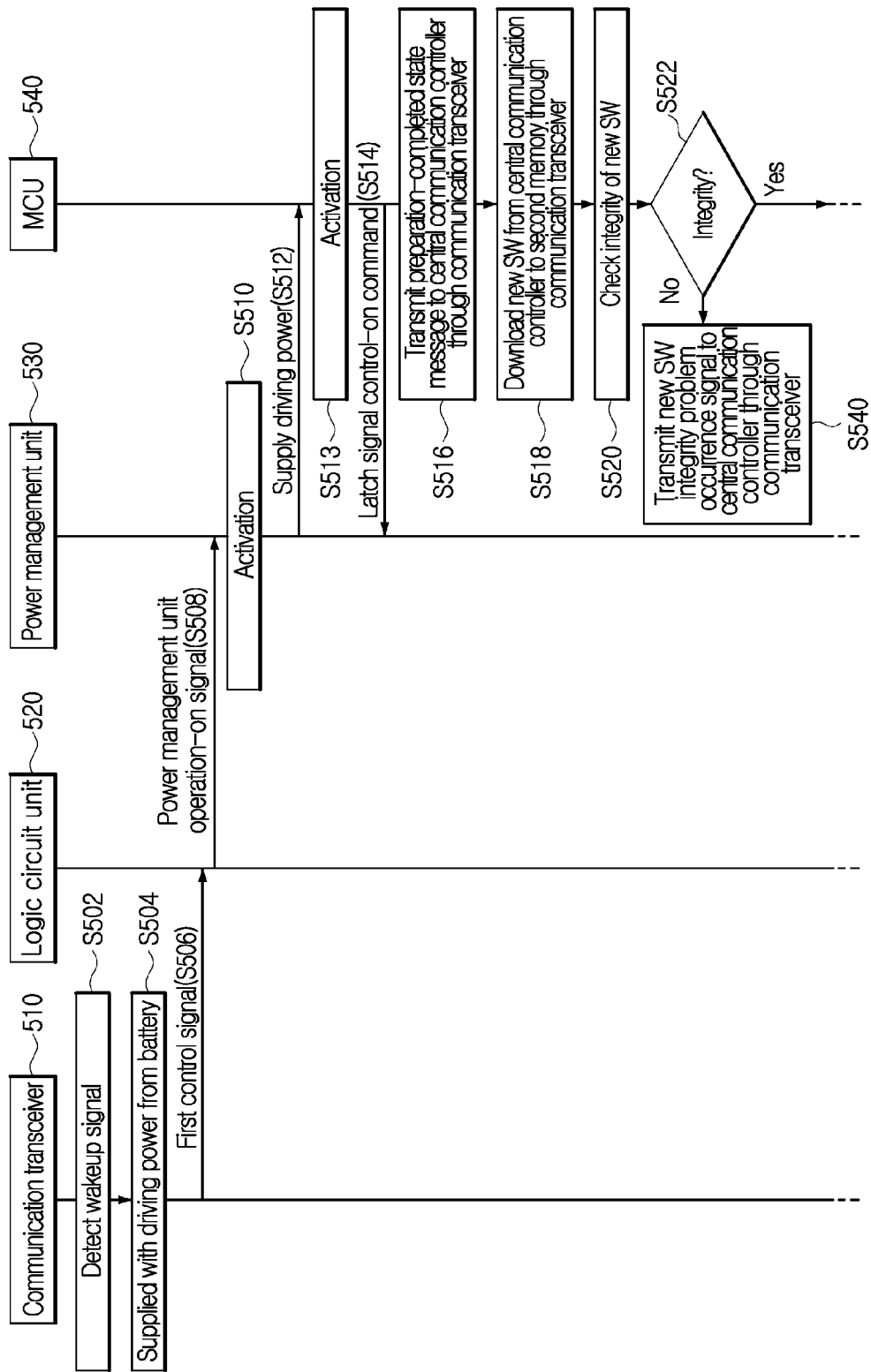
FIGS. 5A and 5B are diagrams for describing an operation of the MDPS controller updating new SW in the key-off state of a vehicle according to an embodiment of the present disclosure.
Figure 5B:
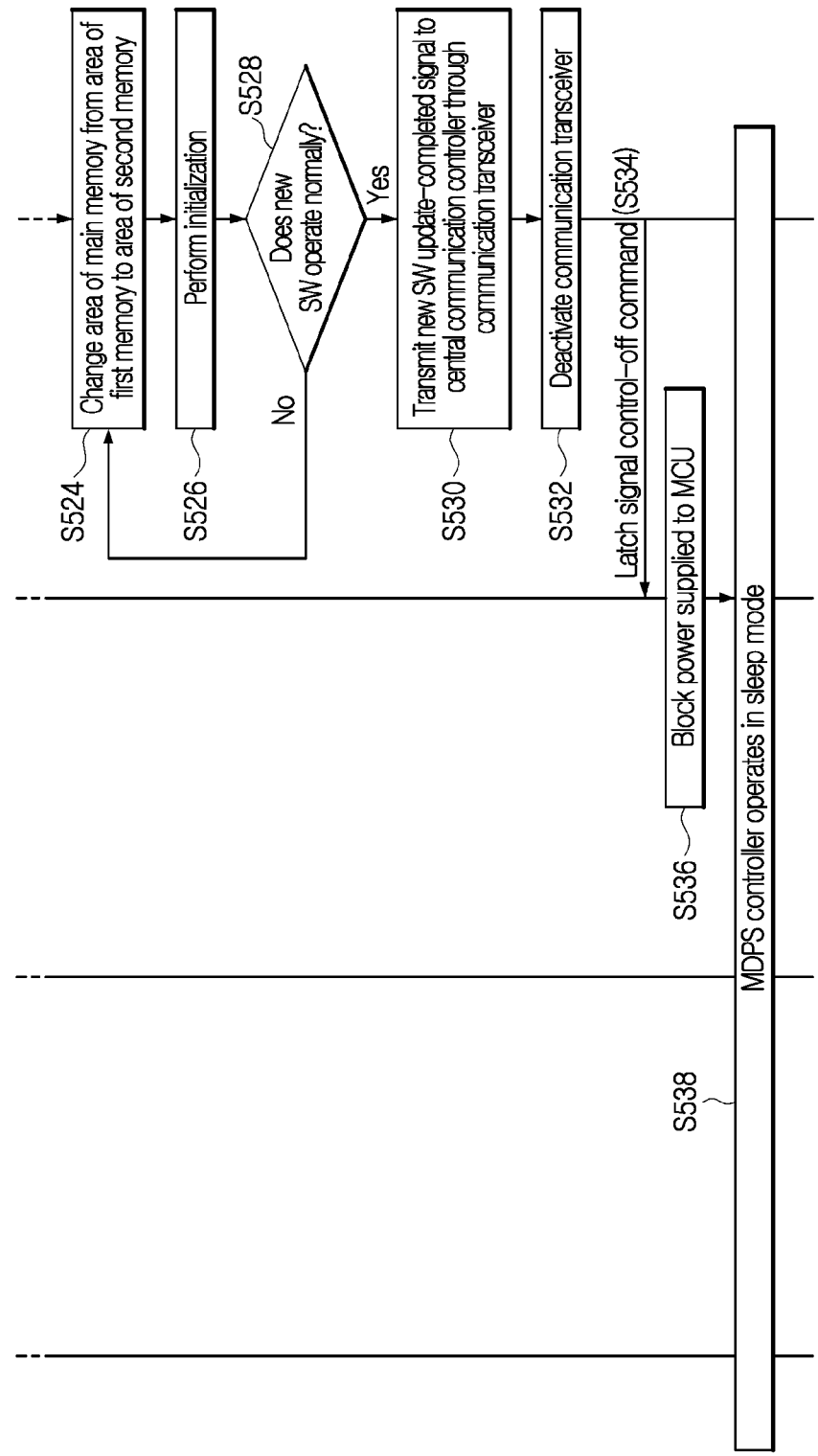

FIGS. 5A and 5B are diagrams for describing an operation of the MDPS controller 500 updating new SW in the key-off state of a vehicle according to an embodiment of the present disclosure.

Referring to FIGS. 5A and 5B, when detecting a wakeup signal (S502), the communication transceiver 510 is activated and supplied with driving power from the battery 400 by turning on the first switch connected to the battery 400 (S504), and transmits, to the logic circuit unit 520, a first control signal for activating the power management unit 530 by turning on the second switch connected to the logic circuit unit 520 (S506).

The logic circuit unit 520 that has received the first control signal transmits a power management unit operation-on signal to the power management unit 530 (S508). The power management unit 530 is activated by the power management unit operation-on signal (S510), and supplies driving power to the MCU 540 (S512).

When being supplied with the driving power through the power management unit 530, the MCU 540 is activated (S513), and transmits a latch signal control-on command to the power management unit 530 through SPI communication in order to continuously receive the power even though the MCU 540 is reset (S514). The power management unit 530 that has received the latch signal control-on command may transmit a latch signal to the logic circuit unit 520 in order to supply power the MCU 540 even though the MCU 540 is reset.

Through the execution of step S514, the MCU 540 can be continuously supplied with power through the power management unit 530, and transmits a preparation-completed state message to the central communication controller 300 through the communication transceiver 510 (S516).

After performing step S516, the MCU 540 downloads new SW from the central communication controller 300 to the second memory 546 in which an old version of SW has not been stored through the communication transceiver 510 (S518).

When performing step S518, the MCU 540 checks the integrity of the downloaded new SW (S520), and determines whether the integrity of the new SW is verified (S522). In this case, the MCU 540 may check the integrity of the new SW by using a checksum method, etc.

When the integrity of the new SW is not verified as a result of the determination in step S522, the MCU 540 transmits a new SW integrity problem occurrence signal to the central communication controller 300 through the communication transceiver 510 (S540). The central communication controller 300 that has received the new SW integrity problem occurrence signal may repeatedly perform the download and error check of the new SW until the update of the new SW is successfully completed.

When the integrity of the new SW is verified as a result of the determination in step S522, the MCU 540 changes an area of a main memory from an area of the first memory 544 to an area of the second memory 546 (S524), and performs the initialization of the MCU 540 (S526). The MCU 540 may perform self-reset within the MCU 540 in order to incorporate a portion in which the area of the main memory has been changed from the area of the first memory 544 to the area of the second memory 546.

After performing step S526, the MCU 540 determines whether the new SW operates normally (S528). That is, the MCU 540 may determine whether the new SW operates normally by driving the new SW.

When the new SW operates normally as a result of the determination in step S528, the MCU 540 transmits a new SW update-complete signal to the central communication controller 300 through the communication transceiver 510 (S530), and deactivates the communication transceiver 510 (S532) in order to turn off the first control signal that controls the power management unit 530. In this case, the MCU 540 may block the power supplied to the communication transceiver 510 by turning off the switch unit 514 of the communication transceiver 510. Accordingly, the communication transceiver 510 may be deactivated.

After performing step S532, the MCU 540 transmits a latch signal control-off command to the power management unit 530 through SPI communication (S534). The power management unit 530 blocks power supplied to the MCU 540 in response to the latch signal control-off command (S536). Accordingly, the MDPS controller 500 operates in the sleep mode (S538). That is, the function of the MDPS controller 500 may become off.

Figure 6B:
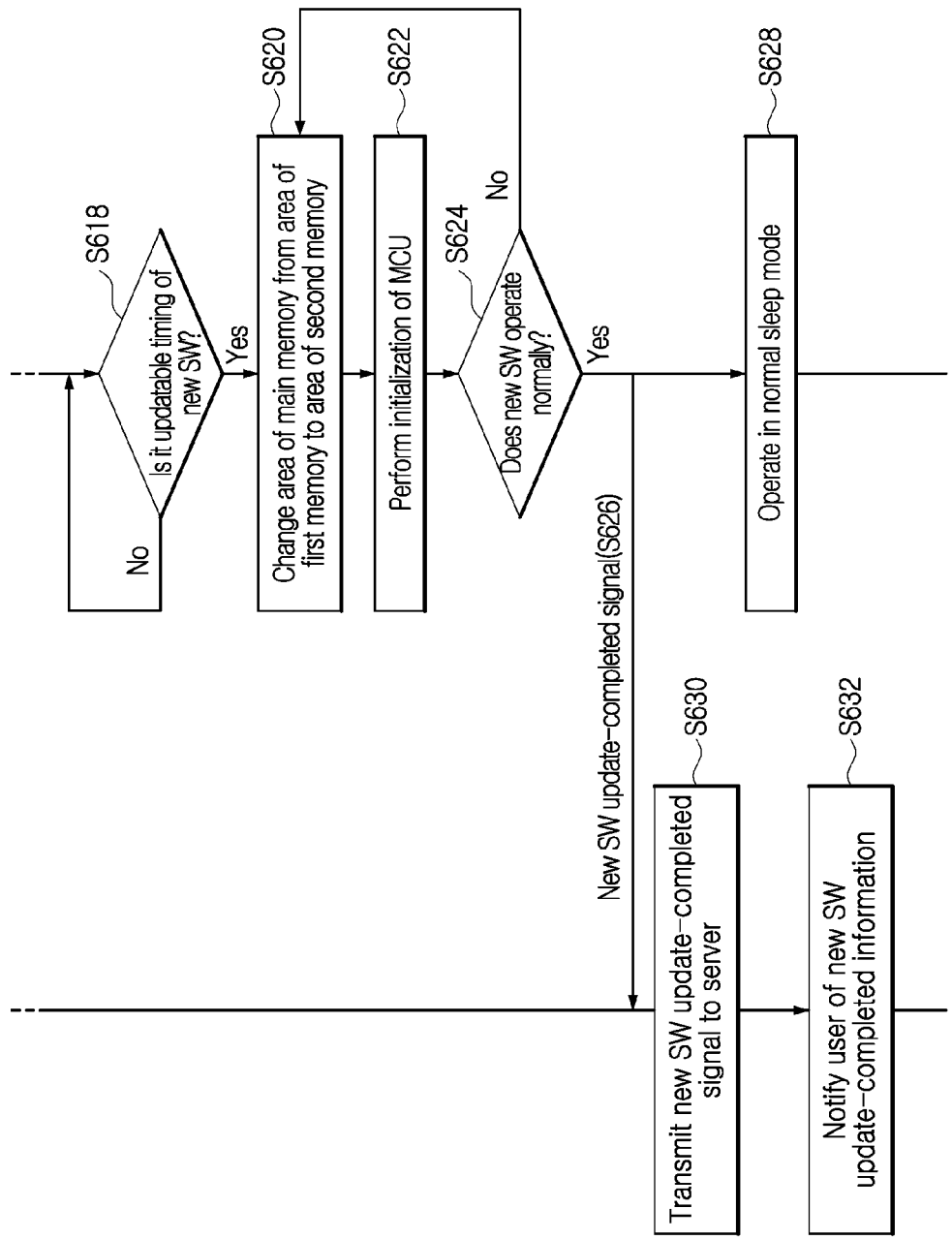

FIGS. 6A and 6B are diagrams for describing a method of controlling the update of SW of the MDPS apparatus in the key-on state of a vehicle according to an embodiment of the present disclosure.

Referring to FIGS. 6A and 6B, when the key of the vehicle becomes on (S602), the MDPS controller 500 is activated by a vehicle key-on signal (S604). That is, when the key of the vehicle becomes on, the power management unit 530 becomes on, and the power management unit 530 may supply driving power to the MCU 540. Accordingly, the MDPS controller 500 may be activated.

When step S604 is performed, the central communication controller 300 determines whether new SW of the MDPS controller 500 has been registered with the server 100 (S606). In this case, the central communication controller 300 may determine whether the new SW has been registered with the server 100 by comparing the latest version information of the new SW stored in the server 100 and current version information of SW of the MDPS controller 500. In this case, the current version information of the SW of the MDPS controller 500 may be collected from the MDPS controller 500 when the vehicle is started.

When the new SW is registered with the server 100 as a result of the determination in step S606, the central communication controller 300 downloads the new SW from the server 100 through wireless communication (S608), and transmits the downloaded new SW to the MDPS controller 500 as a background through wired communication (S610). The MDPS controller 500 downloads, to an area of the second memory 546 in which an old version of SW has not been stored, the new SW received from the central communication controller 300 (S612). In this case, after downloading the new SW to the embedded memory, the central communication controller 300 may transmit the downloaded SW to the MDPS controller 500 as a background through wired communication. Furthermore, while downloading the new SW, the central communication controller 300 may transmit the downloaded SW to the MDPS controller 500 as a background through wired communication in real time. In this case, the central communication controller 300 may transmit the new SW to the MDPS controller 500 by using the remaining load by taking into consideration a wired communication network and a load factor of the MCU 540 within the MDPS controller 500.

When performing step S612, the MDPS controller 500 checks the integrity of the downloaded new SW (S614) and determines whether the integrity of the new SW is verified (S616). In this case, the MDPS controller 500 may check the integrity of the new SW by using a checksum method, etc.

When the integrity of the new SW is not verified as a result of the determination in step S616, the MDPS controller 500 transmits a new SW integrity problem occurrence signal to the central communication controller 300 (S634). Accordingly, the central communication controller 300 may perform step S608 again. The download and integrity (error) check of the new SW may be repeatedly performed until the update is successfully completed. The user terminal 600 may be notified of a situation according to a preset option.

When the integrity of the new SW is verified as a result of the determination in step S616, the MDPS controller 500 checks updatable timing of the downloaded new SW (S618). In this case, the MDPS controller 500 may check a SW-updatable condition including at least one of the key-off state of the vehicle, an engine RPM "0", a vehicle speed "0", and the reception of an update approval command from a user. When the SW-updatable condition is satisfied, the MDPS controller 500 may determine corresponding timing as the updatable timing of the new SW. That is, when a state of the vehicle is the key-off state, the vehicle engine is the off state, the vehicle is a stop state, and an update approval command is received from a driver (or a user), the MDPS controller 500 may determine the corresponding timing as the updatable timing of the new SW. At this time, the MDPS controller 500 may perform notification of a SW update schedule through an audio video navigation (AVN) device (not illustrated) within the vehicle, the user terminal 600, etc., and may receive the update approval command from the user.

When the updatable timing of the new SW is reached as a result of the check in step S618, the MDPS controller 500 changes an area of a main memory from an area of the first memory 544 to an area of the second memory 546 (S620), and performs the initialization of the MCU 540 (S622). The MDPS controller 500 may perform self-reset within the MCU 540 in order to incorporate a portion in which the area of the main memory has been changed from the first memory 544 to the second memory 546.

After performing step S622, the MDPS controller 500 determines whether the new SW operates normally (S624).

When the new SW operates normally as a result of the determination in step S624, the MDPS controller 500 transmits a new SW update-completed signal to the central communication controller 300 through wired communication (S626), and operates in the normal sleep mode (S628). The MDPS controller 500 may be deactivated when the update of the new SW is completed.

The central communication controller 300 that has received the new SW update-completed signal transmits a new SW update-completed signal to the server 100 through wireless communication (S630). The server 100 transmits new SW update-completed information to the user terminal 600 (S632).

If the new SW has not been registered with the server 100 as a result of the determination in step S606, the central communication controller 300 transmits a new SW non-registration message to the MDPS controller 500 so that the MDPS controller 500 continues to operate by using an old version of SW stored in the first memory 544 (S636). That is, if new SW has not been registered, the central communication controller 300 may transmit the new SW non-registration message to the MDPS controller 500. The MDPS controller 500 may operate by using the old version of SW stored in the first memory 544.

Thereafter, when a state of the vehicle is the key-off state, the engine RPM is "0", and the vehicle speed is "0" (S638), the MDPS controller 500 becomes a deactivation state and operates in the sleep mode (S640). At this time, the MCU 540 of the MDPS controller 500 may deactivate the communication transceiver 510 in order to turn off a first control signal that controls the power management unit 530. In this case, the MCU 540 may block the power supplied to the communication transceiver 510 by turning off the switch unit 514 (i.e., the first switch and the second switch) of the communication transceiver 510. Accordingly, the communication transceiver 510 may be deactivated. Furthermore, the MCU 540 may transmit a latch signal control-off command to the power management unit 530 through SPI communication. The power management unit 530 may block the power supplied to the MCU 540 in response to the latch signal control-off command. Accordingly, the MDPS controller 500 may operate in the sleep mode.

Figure 7A:
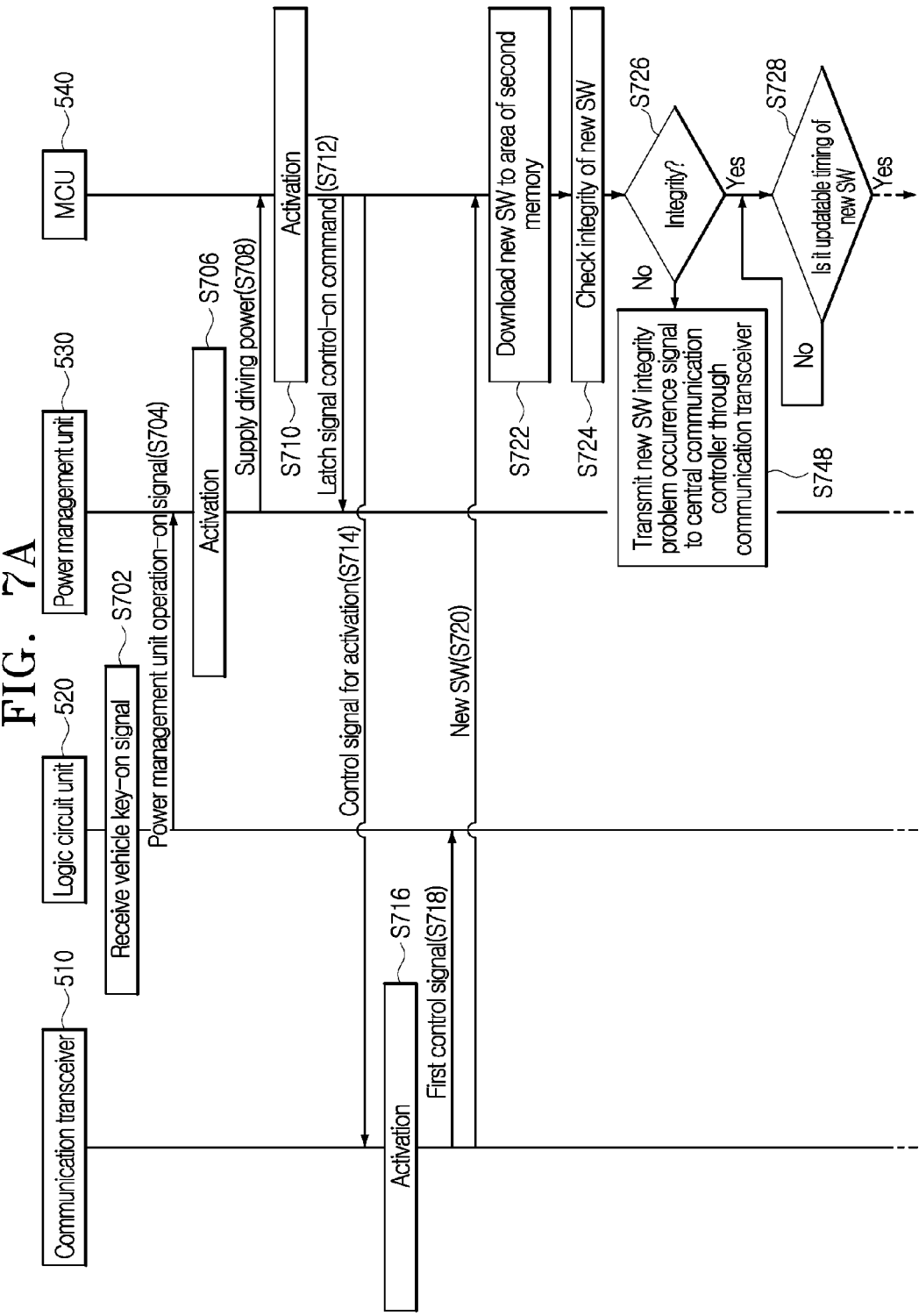
FIGS. 7A and 7B are diagrams for describing an operation of the MDPS controller updating new SW in the key-on state of a vehicle according to an embodiment of the present disclosure.
Figure 7B:
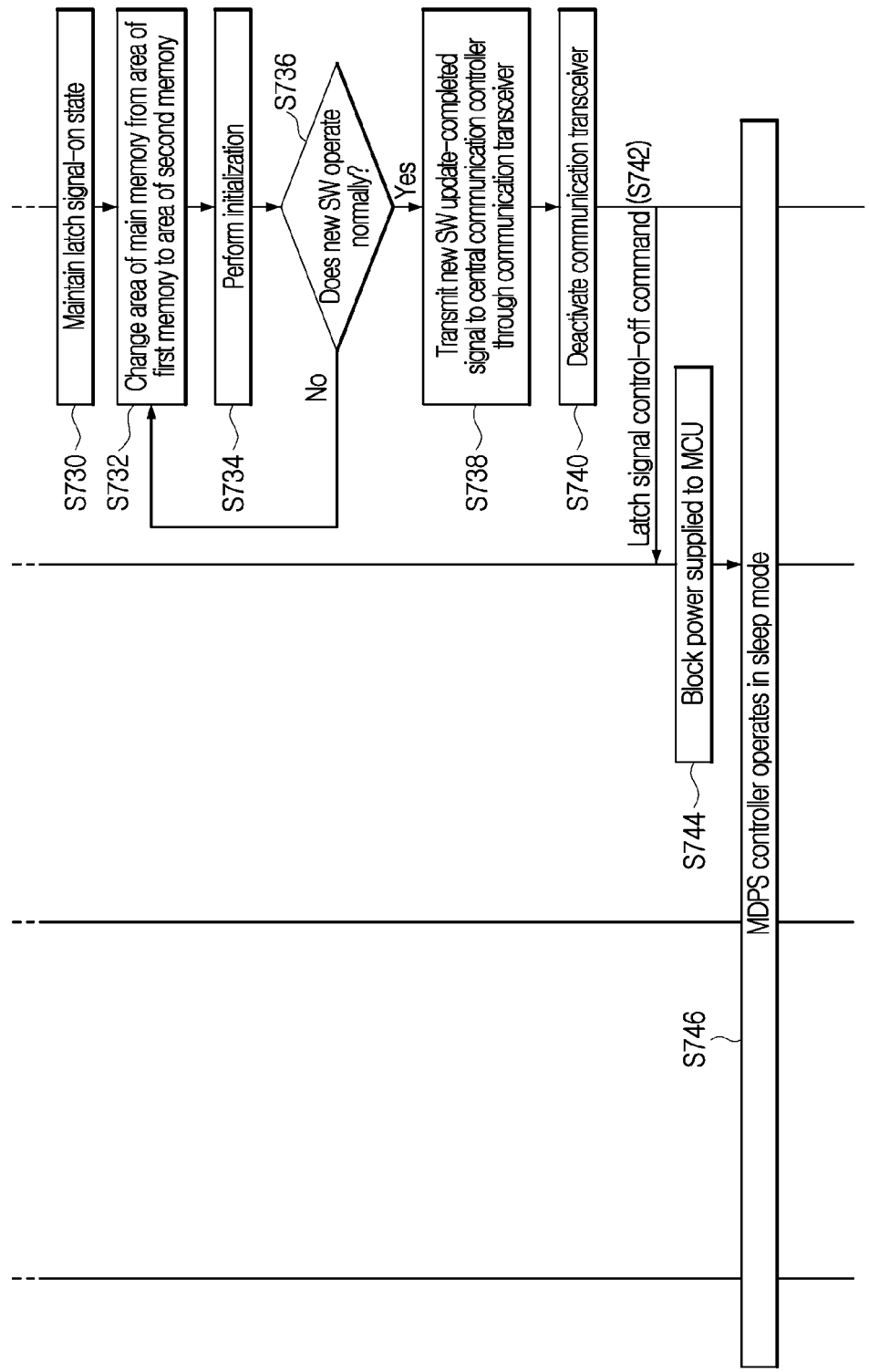

FIGS. 7A and 7B are diagrams for describing an operation of the MDPS controller 500 updating new SW in the key-on state of a vehicle according to an embodiment of the present disclosure.

Referring to FIGS. 7A and 7B, when receiving a vehicle key-on signal (S702), the logic circuit unit 520 transmits a power management unit operation-on signal to the power management unit 530 (S704). The power management unit 530 is activated by the operation-on signal (S706), and supplies driving power to the MCU 540 (S708). That is, when the vehicle key-on signal is received, the MDPS controller 500 may be activated.

When being supplied with the driving power through the power management unit 530, the MCU 540 is activated (S710), and transmits a latch signal control-on command to the power management unit 530 through SPI communication in order to continuously receive the power even though the MCU 540 is reset (S712). The power management unit 530 that has received the latch signal control-on command may transmit a latch signal to the logic circuit unit 520 in order to supply the power to the MCU 540 even though the MCU 540 is reset.

When performing step S712, the MCU 540 transmits a control signal for activating the communication transceiver 510 (S714). The communication transceiver 510 is activated by the activation control signal (S716).

The activated communication transceiver 510 transmits a first control signal for activating the power management unit 530 to the logic circuit unit 520 by turning on the switch unit 514 (S718). That is, the MCU 540 may activate the communication transceiver 510, and may control the communication transceiver 510 to transmit the first control signal for activating the power management unit 530 to the logic circuit unit 520.

When performing step S718, the communication transceiver 510 transmits new SW from the central communication controller 300 to the MCU 540 (S720). The MCU 540 downloads the new SW to the second memory 546 in which an old version of SW has not been stored (S722).

When performing step S722, the MCU 540 checks the integrity of the downloaded new SW (S724), and determines whether the integrity of the new SW is verified (S726).

When the integrity of the new SW is not verified as a result of the determination in step S726, the MCU 540 transmits a new SW integrity problem occurrence signal to the central communication controller 300 through the communication transceiver 510 (S748). The central communication controller 300 that has received the new SW integrity problem occurrence signal may repeatedly perform the download and error check of the new SW until the update of the new SW is successfully completed.

When the integrity of the new SW is verified as a result of the determination in step S726, the MCU 540 checks updatable timing of the downloaded new SW (S728). In this case, the MCU 540 may check a new SW-updatable condition including at least one of the key-off state of the vehicle, an engine RPM "0", a vehicle speed "0", and the reception of an update approval command from a user. When the new SW-updatable condition is satisfied, the MCU 540 may determine corresponding timing as the updatable timing of the new SW. That is, when a state of the vehicle is the key-off state, the vehicle engine is an off state, the vehicle is a stop state, and the update approval command is received from the driver (or the user), the MCU 540 may determine the corresponding timing as the updatable timing of the new SW. At this time, the MDPS controller 500 may perform notification of a SW update schedule through an audio video navigation (AVN) device (not illustrated) within the vehicle, the user terminal 600, etc., and may receive the update approval command from the user.

When the updatable timing of the new SW is reached as a result of the check in step S728, the MCU 540 maintains a latch signal-on state of the power management unit 530 (S730), changes an area of a main memory from an area of the first memory 544 to an area of the second memory 546 (S732), and performs initialization (S734). The MCU 540 may perform self-reset within the MCU 540 in order to incorporate a portion in which the area of the main memory has changed from the area of the first memory 544 to the area of the second memory 546.

After performing step S734, the MCU 540 determines whether the new SW operates normally (S736). That is, the MCU 540 may determine whether the new SW operates normally by driving the new SW.

When the new SW operates normally as a result of the determination in step S736, the MCU 540 transmits a new SW update-completed signal to the central communication controller 300 through the communication transceiver 510 (S738), and deactivates the communication transceiver 510 in order to turn off the first control signal that controls the power management unit 530 (S740). In this case, the MCU 540 may block the power supplied to the communication transceiver 510 by turning off the switch unit 514 of the communication transceiver 510. Accordingly, the communication transceiver 510 may be deactivated.

After performing step S740, the MCU 540 transmits a latch signal control-off command to the power management unit 530 through SPI communication (S742). The power management unit 530 blocks power supplied to the MCU 540 in response to the latch signal control-off command (S74). Accordingly, the MDPS controller 500 operates in the sleep mode (S746). That is, the function of the MDPS controller 500 may become off.

As described above, the system and method for controlling the update of SW of an MDPS apparatus according to an aspect of the present disclosure can reduce the possibility that a driver may be exposed to a danger by updating software of the MDPS controller 500 based on a driver's confirmation that is remotely received even in the state in which the key of a vehicle has been off when a software (SW) update according to the improvement of an important function or a campaign/recall is urgently necessary in a vehicle that supports vehicle communication wakeup.

The system and method for controlling the update of SW of an MDPS apparatus according to another aspect of the present disclosure can reduce the possibility that a driver may be exposed to a danger by updating new SW of the MDPS controller 500 after the key of a vehicle is on and providing a safe steering function by the new SW at next key-on timing, even though the update of SW of the MDPS controller 500 is not performed at key-off timing of the vehicle.

The system and method for controlling the update of SW of an MDPS apparatus according to still another aspect of the present disclosure can increase the update safety of new SW, can reduce an AS cost for the replacement of parts, and can reduce a customer complaint because an MCU memory swap over the air (OTA) method that is rapidly changed into a method of downloading new SW while driving and swapping a dual memory embedded in the MCU 540 simultaneously with the key off of a vehicle is used.

The system and method for controlling the update of SW of an MDPS apparatus according to still another aspect of the present disclosure can increase a driver's convenience because a driver can remotely confirm/control the update of SW of the MDPS controller by using a user terminal at key-off timing of a vehicle.

A system for controlling the update of SW of an MDPS apparatus according to another embodiment of the present disclosure is described.

The MDPS apparatus according to another embodiment of the present disclosure has the same configuration as those of FIGS. 1 and 2, and a description of a redundant portion is omitted.

The MDPS SW update apparatus 200 is provided within a vehicle, and SW thereof may be updated by downloading new SW from the server 100 by using the memory swap OTA method. In this case, the memory swap OTA method may be a method of wirelessly downloading, by the central communication controller 300, the latest version of SW (i.e., new SW) from the server 100 and performing, by the MDPS controller 500, an update using the downloaded new SW through the existing wired communication channel (e.g., CAN or CAN-FD). The memory swap OTA method can be rapidly changed into a method of downloading new SW while driving and swapping a dual memory embedded in the MCU simultaneously with the key off of a vehicle.

The MDPS SW update apparatus 200 may include the central communication controller 300, the power unit 400, and the MDPS controller 500.

The central communication controller 300 may wirelessly download the latest version of SW (i.e., new SW) from the server 100 while driving, and may transmit the downloaded new SW to the MDPS controller 500 as a background of a wired communication channel (e.g., CAN or CAN-FD) connected to the MDPS controller 500 by using an available communication load.

The power unit 400 includes a battery power source as main power for the vehicle.

The MDPS controller 500 is the subject of a SW update, and may include a plurality of memories capable of storing and driving SW. Hereinafter, a case where the MDPS controller 500 includes a dualized memory of a first memory 544 and a second memory 546, the first memory 544 stores an old version of SW and the second memory 546 stores new SW is limited and described for convenience of description. The MDPS controller 500 may download new SW from the central communication controller 300 as a background of a wired communication channel (e.g., CAN or CAN-FD), may store the new SW in the second memory 546 in which an old version of SW has not been stored, and may perform the update of the new SW by swapping the first memory 544 in which an old version of SW has been stored and the second memory 546.

Specifically, when a state of the key of the vehicle is an on state, the central communication controller 300 may determine whether new SW of the MDPS controller 500 has been registered with the server 100, may download the new SW from the server 100 through wireless communication when the new SW is registered with the server 100, and may transmit the downloaded new SW to the MDPS controller 500 as a background through wired communication. In this case, the central communication controller 300 may transmit the new SW to the MDPS controller 500 by taking into consideration a wired communication network and a load factor of the MCU 540 within the MDPS controller 500. For example, the central communication controller 300 may transmit the new SW to the MDPS controller 500 as a background by using an available communication load of a wired communication channel (e.g., CAN or CAN-FD).

When a state of the key of the vehicle is an on state, the MDPS controller 500 may be activated by a key-on signal, may download, to the second memory 546, the new SW received from the central communication controller 300, may check the integrity of the downloaded new SW, may check updatable timing of the downloaded new SW when the integrity of the new SW is verified, may change a main memory from the first memory 544 to the second memory 546 when the updatable timing of the new SW is reached, may determine whether the new SW operates normally by performing the initialization of the MCU 540, may transmit a new SW update-completed signal to the central communication controller 300 when the new SW operates normally, and may operate in the normal sleep mode. When the update of the new SW is terminated, the MDPS controller 500 may switch to the sleep mode.

The MDPS controller 500 is described in detail with reference to FIGS. 2 and 8.

Figure 8:
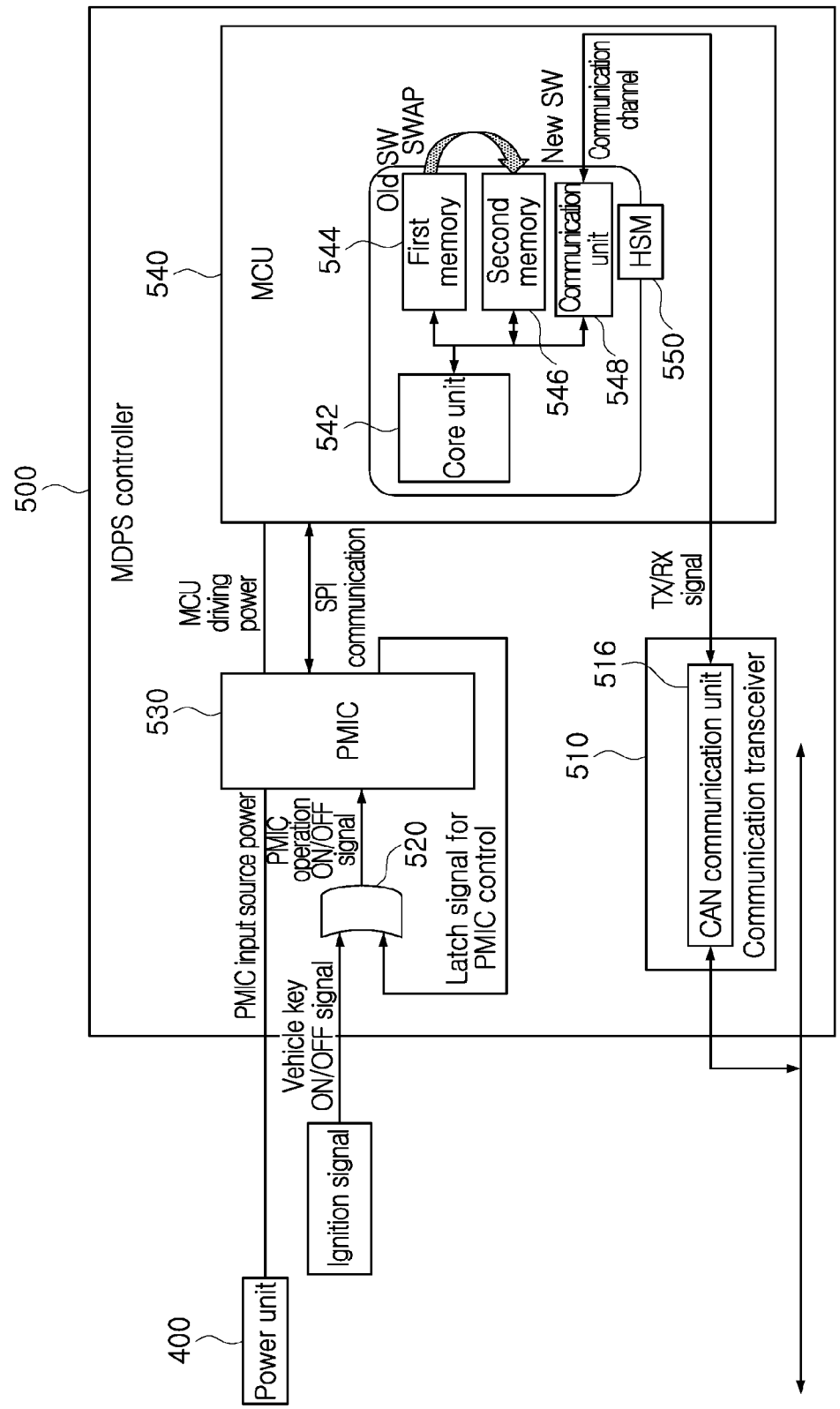
FIG. 8 is a block diagram of a configuration of an MDPS controller according to another embodiment of the present disclosure.

Referring to FIGS. 2 and 8, the MDPS controller 500 according to an embodiment of the present disclosure may include the communication transceiver 510, the logic circuit unit 520, the power management unit 530, and the MCU 540.

The communication transceiver 510 is an element connected to the central communication controller 300 through wired communication and configured to receive new SW from the central communication controller 300, and may include the CAN communication unit 516.

The CAN communication unit 516 is a configuration for providing wired communication with the central communication controller 300, may download new SW from the central communication controller 300, and may transmit the downloaded new SW so that the new SW is stored in the second memory 546 through the communication unit 548 of the MCU 540. Furthermore, the CAN communication unit 516 may provide communication between the MCU 540 and the central communication controller 300.

The logic circuit unit 520 may output a power management unit operation-on signal (i.e., a PMIC operation-on signal) that turns on an operation of the power management unit 530 based on at least one of a vehicle key-on/off signal (i.e., an ignition signal) and a latch signal. In this case, the logic circuit unit 520 is a gate circuit operating as OR logic, and may output the power management unit operation-on signal based on a result of an OR combination of the vehicle key-on/off signal (i.e., an ignition signal) and the latch signal. For example, when receiving the vehicle key-on signal and the latch signal "on", the logic circuit unit 520 may output the power management unit operation-on signal. Furthermore, when receiving the vehicle key-on signal and the latch signal "off", the logic circuit unit 520 may output the power management unit operation-on signal. Furthermore, when receiving the vehicle key-off signal and the latch signal "on", the logic circuit unit 520 may output the power management unit operation-on signal. Furthermore, when receiving the vehicle key-off signal and the latch signal "off", the logic circuit unit 520 may output the power management unit operation-off signal.

The power management unit 530 may be activated when receiving the operation-on signal from the logic circuit unit 520, and may supply driving power to the MCU 540.

Furthermore, the power management unit 530 may control the latch signal (i.e., a latch signal for PMIC control) capable of continuously supplying power to the MCU 540. At this time, if power has to be continuously supplied to the MCU 540 (i.e., when receiving a latch signal control-on command from the MCU 540), the power management unit 530 may transmit the latch signal "on" to the logic circuit unit 520. Furthermore, if power does not need to be continuously supplied to the MCU 540 (i.e., when receiving a latch signal control-off command from the MCU 540), the power management unit 530 may transmit the latch signal "off" to the logic circuit unit 520.

That is, after the key-off of the vehicle or the self-reset of the MCU 540, the MCU 540 needs to be continuously supplied with power because the MCU 540 has to continue to operate and perform a subsequent task (e.g., a task for checking whether SW has been updated with new SW normally and transmitting a result of the check to the central communication controller 300). Accordingly, the power management unit 530 controls the latch signal capable of continuously supplying power to the MCU 540, so the MCU 540 can be continuously supplied with power after the key-off of the vehicle or the self-reset of the MCU 540. The power management unit 530 may be implemented as a power management IC (PMIC), etc. The PMIC may be an IC which synthetically performs a regulator function for receiving battery power (12 V or 24 V) and converting the power into a 5 V/3.3 V level which may be used in the MDPS controller 500 and a function for controlling the ON/OFF of several regulators embedded therein in response to a command received from the MCU 540 through SPI communication and performing trouble shooting.

The MCU 540 may include a dualized memory of the first memory 544 and the second memory 546. The MCU 540 may be activated by being supplied with driving power from the power management unit 530, and may transmit a latch signal control-on command to the power management unit 530 through SPI communication in order to be continuously supplied with power even after the key-off of the vehicle or the self-reset of the MCU 540. When receiving the latch signal control-on command, the power management unit 530 may continuously supply power to the MCU 540 by transmitting the latch signal "on" to the logic circuit unit 520.

Power modes of the MDPS controller 500 based on the vehicle key-on/off signal (i.e., an ignition signal) and the latch signal may be the same as those in.

TABLE 1

| POWER MODE OF CONTROLLER | PMIC OPERATION ON/OFF SIGNAL IGNITION SIGNAL | MCU DRIVING LATCH SIGNAL FOR PMIC CONTROL | POWER | NOTES |
| --- | --- | --- | --- | --- |
| #2 | ON | ON | ON | Normal steering assist mode |
| #1 | ON | OFF | ON | Mode before MCU transmits latch signal control-on command through SPI communication after key-on of vehicle |
| #3 | OFF | ON | ON | Mode before MCU transmits latch signal control-on command through SPI communication after key-off of vehicle |
| #4 | OFF | OFF | OFF | Normal sleep mode (controller function off) after key-off of vehicle |

Referring to Table 1, the second power mode (#2) may be a normal steering assist mode. In this case, when the ignition signal is a vehicle key-on signal and the latch signal (i.e., a latch signal for PMIC control) is on, the logic circuit unit 520 may output a power management unit operation-on signal to the power management unit 530. The power management unit 530 may be activated by the operation-on signal, and may supply driving power to the MCU 540. The first power mode (#1) may be a mode before the MCU transmits a latch signal control-on command through SPI communication after the key-on of a vehicle. In this case, when the ignition signal is a vehicle key-on signal and the latch signal (i.e., a latch signal for PMIC control) is off, the logic circuit unit 520 may output a power management unit operation-on signal to the power management unit 530. The power management unit 530 may be activated by the operation-on signal, and may supply driving power to the MCU 540. The third power mode (#3) may be a mode before the MCU transmits a latch signal control-off command through SPI communication after the key-off of a vehicle. In this case, when the ignition signal is a vehicle key-off signal and the latch signal (i.e., a latch signal for PMIC control) is on, the logic circuit unit 520 may output a power management unit operation-on signal to the power management unit 530. The power management unit 530 may be activated by the operation-on signal, and may supply driving power to the MCU 540. The fourth power mode (#4) may be a normal sleep mode of the MDPS controller 500 after the key-off of the vehicle. In this case, when the ignition signal is a vehicle key-off signal and the latch signal (i.e., a latch signal for PMIC control) is off, the logic circuit unit 520 may output a power management unit operation-off signal to the power management unit 530. The power management unit 530 may be deactivated by the operation-off signal, and may block the power supplied to the MCU 540.

Furthermore, the MCU 540 may download new SW from the central communication controller 300 through the CAN communication unit 516, may store the new SW in the second memory 546, may check updatable timing of the new SW when the integrity of the downloaded new SW is verified, and may perform the update of the new SW by swapping the first memory 544 and the second memory 546 when the updatable timing of the new SW is reached. In this case, the MCU 540 may determine corresponding timing as the updatable timing of the new SW when a SW-updatable condition including at least one of the key-off state of the vehicle, an engine RPM "0", a vehicle speed "0", and the reception of an update approval command from a user is satisfied.

The communication unit 548 may form a communication channel between the MCU 540 and the communication transceiver 510 while operating in conjunction with the CAN communication unit 516.

The core unit 542 is a configuration for controlling operations of various components of the MCU 540, may activate the MCU 540 when driving power is supplied by the power management unit 530, and may transmit a latch signal control-on command to the power management unit 530.

Furthermore, when receiving new SW through the communication unit 548, the core unit 542 may download the new SW to the second memory 546 in which an old version of SW has not been stored, and may verify the integrity of the new SW downloaded to the second memory 546. In this case, the core unit 542 may check the integrity of the new SW by using a checksum method, etc.

Furthermore, when the integrity of the new SW is verified, the core unit 542 may check updatable timing of the new SW, may change a main memory from the first memory 544 to the second memory 546 when the updatable timing of the new SW is reached, and may determine whether the new SW operates normally by performing the initialization of the MCU 540. In this case, the first memory 544 and the second memory 546 may include non-volatile memories, such as a flash memory, a read only memory (ROM), an erasable programmable read only memory (EPROM), and an electrically erasable programmable read only memory (EEPROM). In particular, the first memory 544 and the second memory 546 may include a memory on which read/write can be repeated among non-volatile memories.

When the new SW operates normally, the core unit 542 may transmit a new SW update-completed signal to the central communication controller 300 through the communication unit 548 and the communication transceiver 510.

Furthermore, when the update of the new SW is completed, the core unit 542 may transmit a latch signal control-off command to the power management unit 530. The power management unit 530 that has received the latch signal control-off command may block the power supplied to the MCU by transmitting the latch signal "off" to the logic circuit unit. When power supplied to the MCU is blocked as described above, the MDPS controller 500 may operate in the normal sleep mode.

Figure 9A:
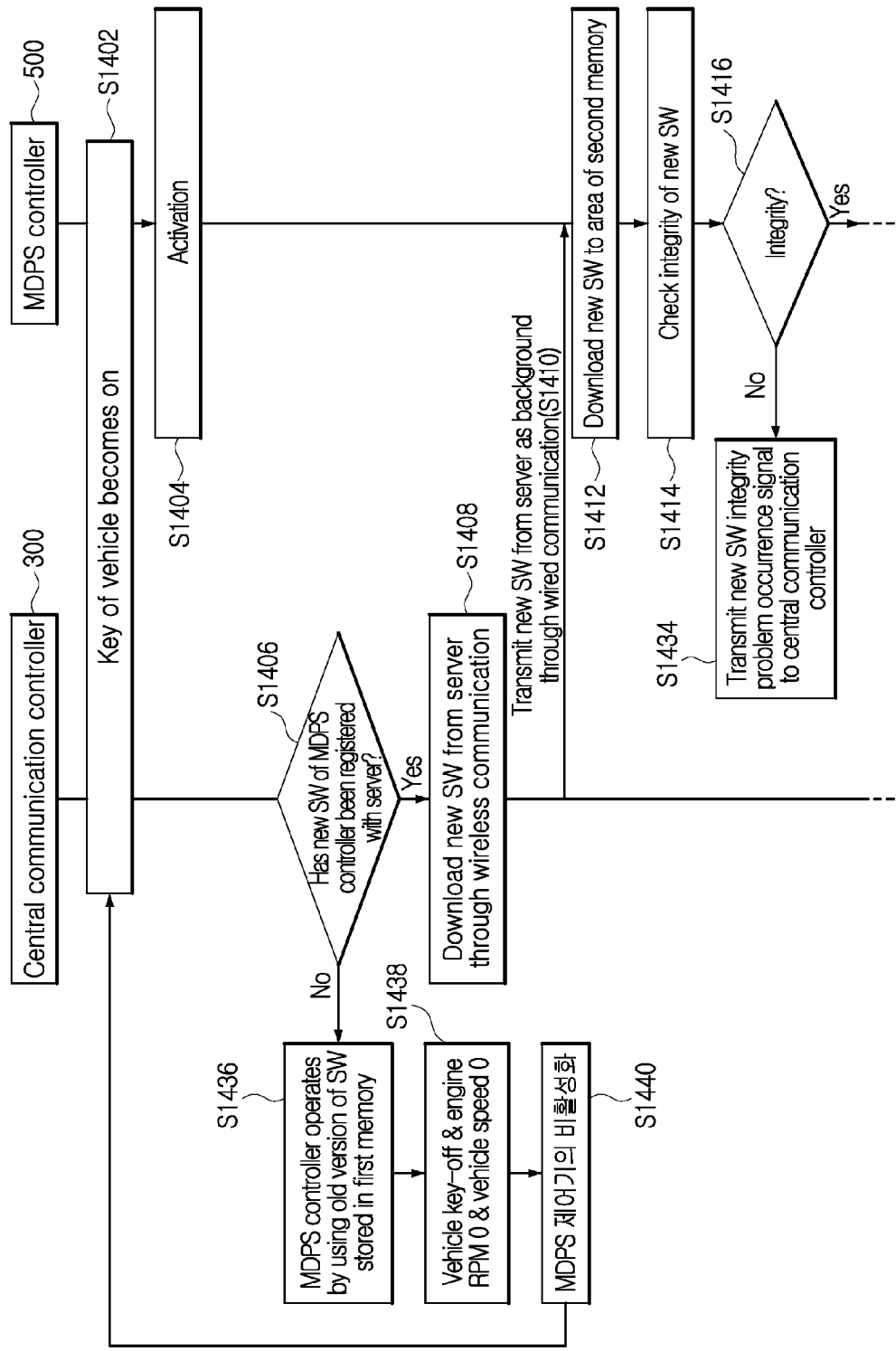
FIGS. 9A and 9B are diagrams for describing a method of controlling the update of SW of the MDPS apparatus according to an embodiment of the present disclosure.
Figure 9B:
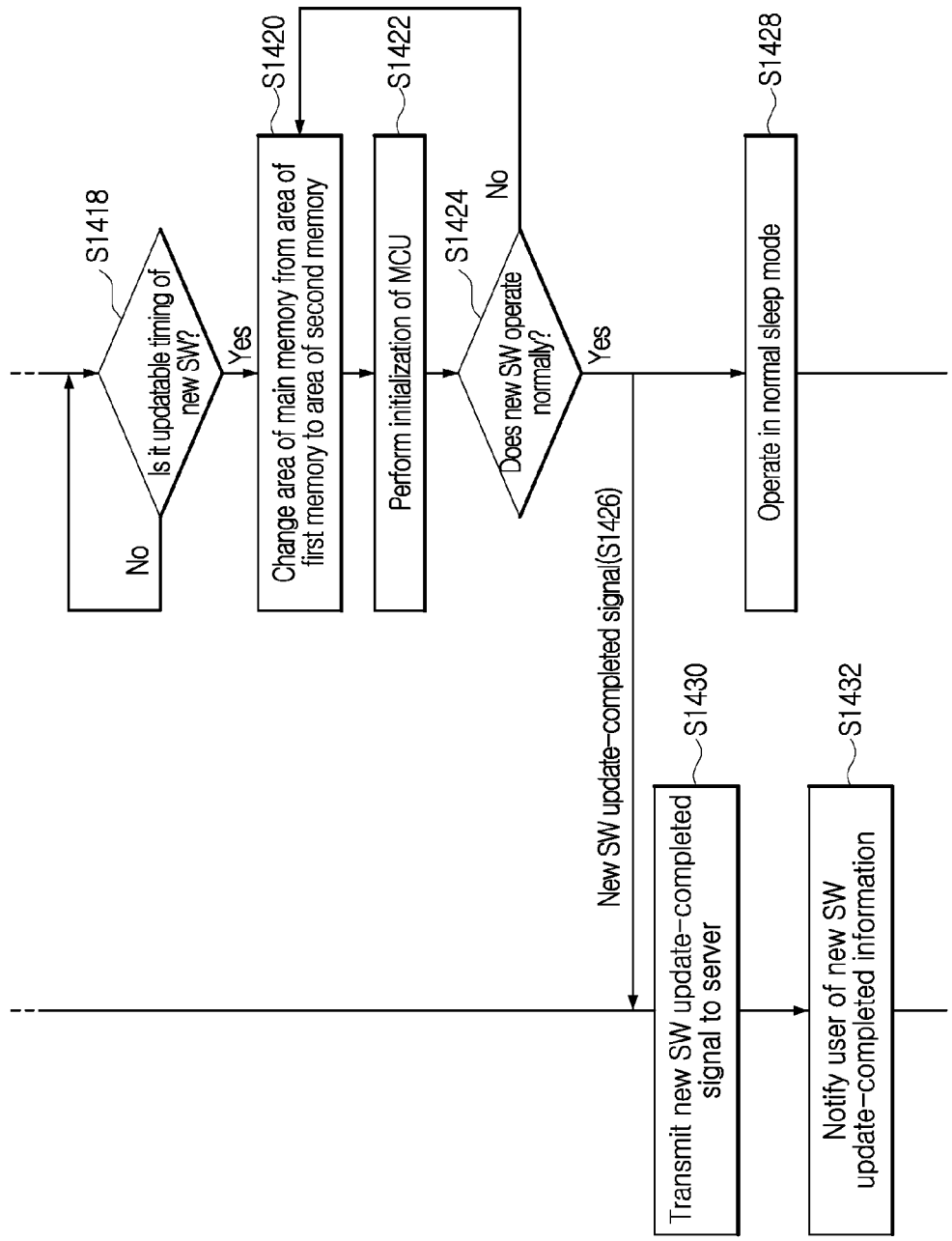

FIGS. 9A and 9B are diagrams for describing a method of controlling the update of SW of the MDPS apparatus according to an embodiment of the present disclosure.

Referring to FIGS. 9A and 9B, when the key of a vehicle becomes on (S1402), the MDPS controller 500 is activated by a vehicle key-on signal (S1404). That is, when the key of the vehicle becomes on, the power management unit 530 becomes on, and the power management unit 530 may supply driving power to the MCU 540. Accordingly, the MDPS controller 500 may be activated.

When step S1404 is performed, the central communication controller 300 determines whether new SW of the MDPS controller 500 has been registered with the server 100 (S1406). In this case, the central communication controller 300 may determine whether the new SW has been registered with the server 100 by comparing the latest version information of the new SW stored in the server 100 and current version information of SW of the MDPS controller 500. In this case, the current version information of the SW of the MDPS controller 500 may be collected from the MDPS controller 500 when the vehicle is started.

If the new SW has been registered with the server 100 as a result of the determination in step S1406, the central communication controller 300 downloads the new SW from the server 100 through wireless communication (S1408), and transmits the downloaded new SW to the MDPS controller 500 as a background through wired communication (S1410). The MDPS controller 500 downloads, to the second memory 546, the new SW received from the central communication controller 300 (S1412). In this case, after completing the download of the new SW to the embedded memory, the central communication controller 300 may also transmit the new SW to the MDPS controller 500 as a background through wired communication. Furthermore, the central communication controller 300 may transmit the new SW to the MDPS controller 500 as a background through wired communication in real time while downloading the new SW. In this case, the central communication controller 300 may transmit the new SW to the MDPS controller 500 by using the remaining load by taking into consideration a wired communication network and a load factor of the MCU 540 within the MDPS controller 500.

When performing step S1412, the MDPS controller 500 checks the integrity of the downloaded new SW (S1414), and determines whether the integrity of the new SW is verified (S1416). In this case, the MDPS controller 500 may check the integrity of the new SW by using a checksum method, etc.

When the integrity of the new SW is not verified as a result of the determination in step S1416, the MDPS controller 500 transmits a new SW integrity problem occurrence signal to the central communication controller 300 (S1434). Accordingly, the central communication controller 300 may perform step S408 again. The download and integrity (error) check of the new SW may be repeatedly performed until the update is successfully completed. The user terminal 600 may be notified of a situation according to a preset option.

When the integrity of the new SW is verified as a result of the determination in step S1416, the MDPS controller 500 checks updatable timing of the downloaded new SW (S1418). In this case, the MDPS controller 500 may check a SW-updatable condition including at least one of the key-off state of the vehicle, an engine RPM "0", a vehicle speed "0", and the reception of an update approval command from a user. When the SW-updatable condition is satisfied, the MDPS controller 500 may determine corresponding timing as the updatable timing of the new SW. That is, when a state of the vehicle is a key-off state, the vehicle engine is an off state, the vehicle is a stop state, and the update approval command is received from the driver (or the user), the MDPS controller 500 may determine the corresponding timing as the updatable timing of the new SW. In this case, the MDPS controller 500 may perform notification of a SW update schedule through an audio video navigation (AVN) device (not illustrated) in the vehicle, the user terminal 600, etc., and may receive the update approval command from the user.

When the updatable timing of the new SW is reached as a result of the check in step S1418, the MDPS controller 500 changes an area of a main memory from an area of the first memory 544 to an area of the second memory 546 (S1420), and performs the initialization of the MCU 540 (S1422). The MDPS controller 500 may perform self-reset within the MCU 540 in order to incorporate a portion in which the area of the main memory has been changed from the area of the first memory 544 to the area of the second memory 546.

After performing step S1422, the MDPS controller 500 determines whether the new SW operates normally (S1424).

When the new SW operates normally as a result of the determination in step S1424, the MDPS controller 500 transmits a new SW update-completed signal to the central communication controller 300 through wired communication (S1426), and operates in the sleep mode (S428). When the update of the new SW is completed, the MDPS controller 500 may be deactivated.

The central communication controller 300 that has received the new SW update-complete signal transmits a new SW update-complete signal to the server 100 through wireless communication (S1430). The server 100 transmits new SW update-completed information to the user terminal 600 (S1432). In this case, the user terminal 600 may be a desktop computer, a smartphone, a notebook, a tablet PC, smart TV, a mobile phone, a personal digital assistant (PDA), a laptop, a media player, a micro server, a global positioning system (GPS) apparatus, an E-book terminal, a digital broadcasting terminal, a device for navigation, a kiosk, an MP3 player, a digital camera, home appliances, or another mobile or non-mobile computing device, which has a wireless communication function and is manipulated by a user, but the present disclosure is not limited thereto.

If new SW has not been registered with the server 100 as a result of the determination in step S1406, the central communication controller 300 transmits a new SW non-registration message to the MDPS controller 500 so that the MDPS controller 500 continues to operate by using an old version of SW stored in the first memory 544 (S1436). That is, if new SW has not been registered, the central communication controller 300 transmits the new SW non-registration message to the MDPS controller 500. The MDPS controller 500 may operate by using the old version of SW stored in the first memory 544.

Thereafter, when a state of the vehicle is a key-off state, the engine RPM is "0", and the vehicle speed is "0" (S1438), the MDPS controller 500 operates in the deactivation state (S1440). In this case, the MCU 540 of the MDPS controller 500 may transmit a latch signal control-off command to the power management unit 530 through SPI communication.

The power management unit 530 may block the power supplied to the MCU 540 in response to the latch signal control-off command. Accordingly, the function of the MDPS controller 500 may become off.

Figure 10A:
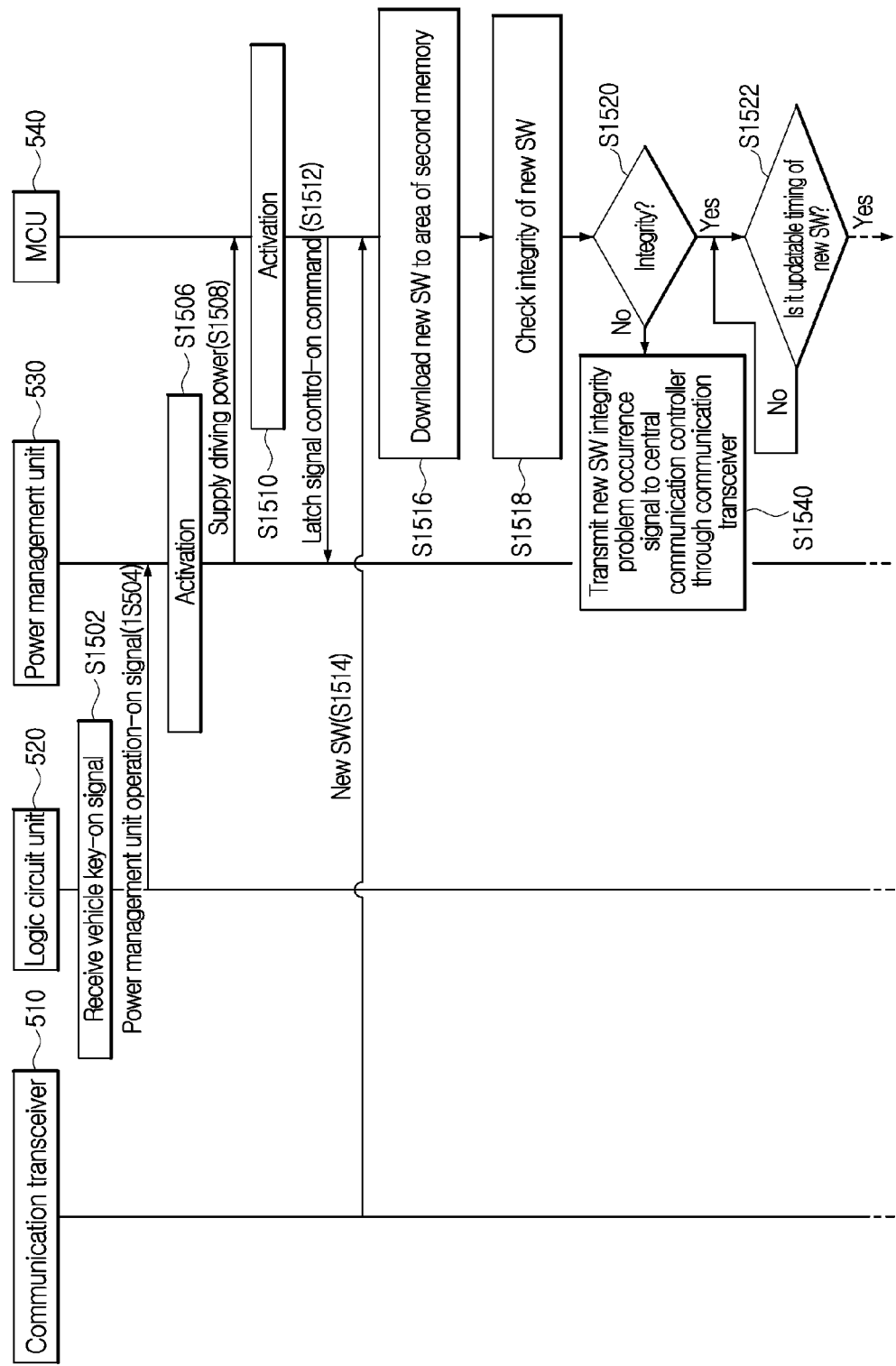
FIGS. 10A and 10B are diagrams for describing an operation of the MDPS controller updating new SW according to an embodiment of the present disclosure.
Figure 10B:
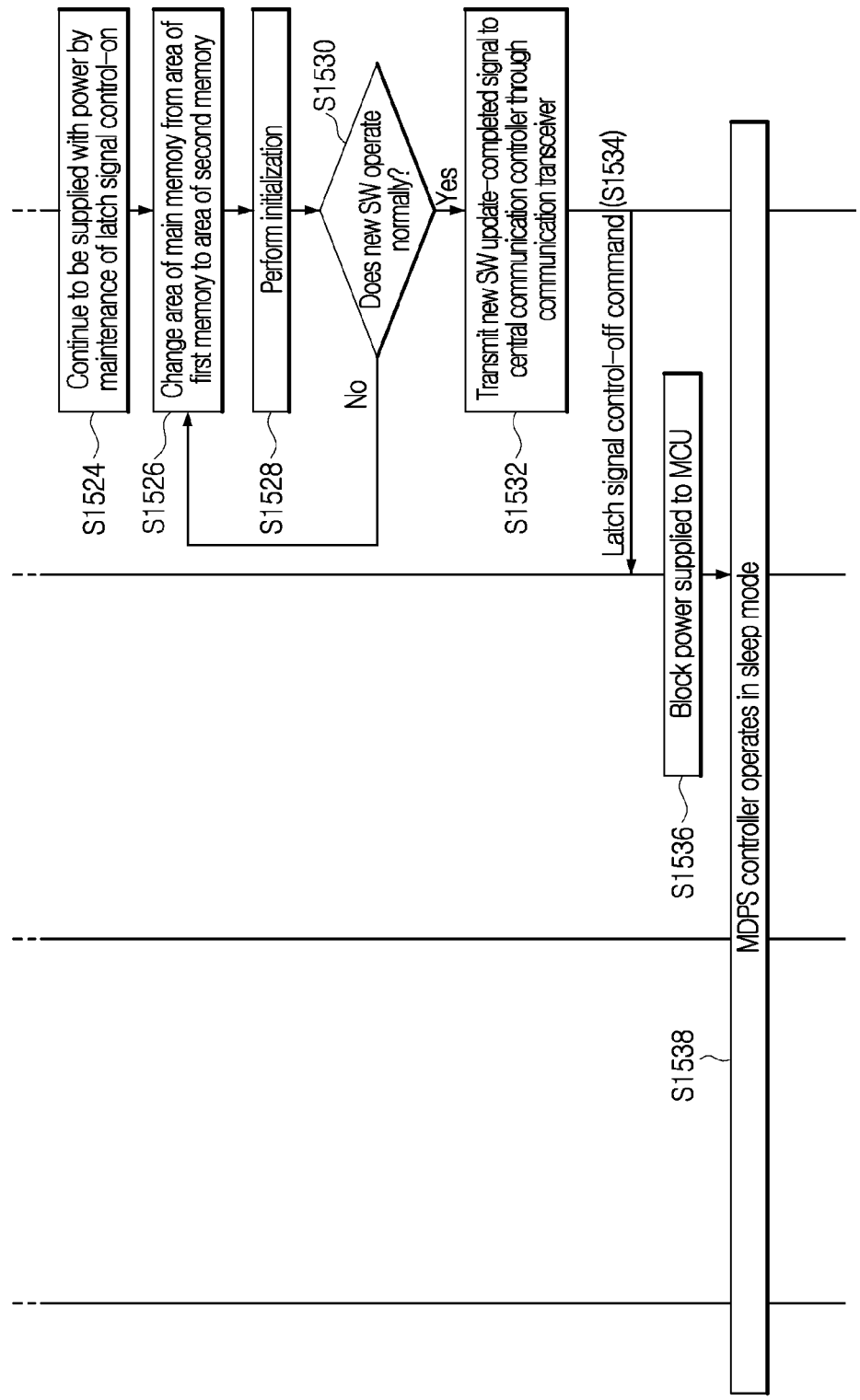

FIGS. 10A and 10B are diagrams for describing an operation of the MDPS controller updating new SW according to an embodiment of the present disclosure.

Referring to FIGS. 10A and 10B, when receiving a vehicle key-on signal (S1502), the logic circuit unit 520 transmits a power management unit operation-on signal to the power management unit 530 (S1504). The power management unit 530 is activated by the operation-on signal (S1506), and supplies driving power to the MCU 540 (S1508). That is, when receiving the vehicle key-on signal, the MDPS controller 500 may be activated.

When being supplied with the driving power through the power management unit 530, the MCU 540 is activated (S1510), and transmits a latch signal control-on command to the power management unit 530 through SPI communication in order to continuously receive the power even though the key of a vehicle becomes off or the MCU 540 is reset (S1512). The power management unit 530 that has received the latch signal control-on command may transmit the latch signal to the logic circuit unit 520 in order to supply the power to the MCU 540 even though the key of the vehicle becomes off or the MCU 540 is reset. Even though the key of the vehicle becomes off by the latch signal control-on command, the MDPS controller 500 can maintain the activation state by being supplied with the power from the power management unit 530.

When step S1512 is performed, the communication transceiver 510 transmits, to the MCU 540, new SW from the central communication controller 300 (S1514). The MCU 540 downloads the new SW to the second memory 546 (S1516).

When performing step S516, the MCU 540 checks the integrity of the downloaded new SW (S1518), and determines whether the integrity of the new SW is verified (S1520).

When the integrity of the new SW is not verified as a result of the determination in step S1520, the MCU 540 transmits a new SW integrity problem occurrence signal to the central communication controller 300 through the communication transceiver 510 (S1540). The central communication controller 300 that has received the new SW integrity problem occurrence signal may repeatedly perform the download and the error check of the new SW until the update of the new SW is successfully completed.

When the integrity of the new SW is verified as a result of the determination in step S1520, the MCU 540 checks updatable timing of the downloaded new SW (S1522). In this case, the MCU 540 may check a new SW-updatable condition including at least one of the key-off state of the vehicle, an engine RPM "0", a vehicle speed "0", and the reception of an update approval command from a user. When the new SW-updatable condition is satisfied, the MCU 540 may determine corresponding timing as the updatable timing of the new SW. That is, when a state of the vehicle is the key-off state, the vehicle engine is an off state, the vehicle is a stop state, and the update approval command is received from the driver (or the user), the MCU 540 may determine the corresponding timing as the updatable timing of the new SW. In this case, the MDPS controller 500 may perform notification of a SW update schedule through an audio video navigation (AVN) device (not illustrated) in the vehicle, the user terminal 600, etc., and may receive the update approval command from the user.

When the updatable timing of the new SW is reached as a result of the check in step S1522, the MCU 540 continues to be supplied with the power through the power management unit 530 by the maintenance of the latch signal control-on of the power management unit 530 (S1524), changes an area of a main memory from an area of the first memory 544 to an area of the second memory 546 (S1526), and performs initialization (S1528). The MCU 540 may perform self-reset within the MCU 540 in order to incorporate a portion in which the area of the main memory has been changed from the area of the first memory 544 to the area of the second memory 546.

After performing step S528, the MCU 540 determines whether the new SW operates normally (S1540). That is, the MCU 540 may determine whether the new SW operates normally by driving the new SW.

When the new SW operates normally as a result of the determination in step S1530, the MCU 540 transmits a new SW update-complete signal to the central communication controller 300 through the communication transceiver 510 (S1532), and transmits a latch signal control-off command to the power management unit 530 through SPI communication (S1534).

Accordingly, the power management unit 530 blocks the power supplied to the MCU 540 in response to the latch signal control-off command (S1536). Accordingly, the MDPS controller 500 operates in the sleep mode (S1538). That is, the function of the MDPS controller 500 may become off.

As described above, the system and method for controlling the update of SW of the MDPS apparatus according to still another aspect of the present disclosure can update SW of the MDPS controller by using the MCU memory swap OTA method.

The system and method for controlling the update of SW of an MDPS apparatus according to still another aspect of the present disclosure can increase the update safety of new SW, can reduce an after sales service cost for the replacement of parts, and can reduce customer complaints because SW of the MDPS controller is updated by using the MCU memory swap OTA method that is rapidly changed into a method of downloading new SW while driving and swapping a dual memory embedded in the MCU simultaneously with the key off of a vehicle.

The system and method for controlling the update of SW of an MDPS apparatus according to still another aspect of the present disclosure can increase a driver's convenience because a driver can remotely confirm/control the update of SW of the MDPS controller by using a user terminal at key-off timing of a vehicle.

The system and method for controlling the update of software (SW) of an MDPS apparatus, which enable SW of an MDPS controller to be updated based on a driver's confirmation that is remotely received even in the state in which the key of a vehicle has been off when the update of SW according to the improvement of an important function or a campaign/recall is urgently necessary in a vehicle that supports vehicle communication wakeup.

The system and method for controlling the update of software (SW) of an MDPS apparatus, which enable a safe steering function to be provided by new SW of an MDPS controller at next key-on timing by updating the new SW after the key of a vehicle is on even though the update of SW of the MDPS controller is not performed at key-off timing of the vehicle.

The system and method for controlling the update of SW of an MDPS apparatus can reduce the possibility that a driver may be exposed to a danger by updating software of the MDPS controller based on a driver's confirmation that is remotely received even in the state in which the key of a vehicle has been off when a software (SW) update according to the improvement of an important function or a campaign/recall is urgently necessary in a vehicle that supports vehicle communication wakeup.

The system and method for controlling the update of SW of an MDPS apparatus can reduce the possibility that a driver may be exposed to a danger by updating new SW of the MDPS controller after the key of a vehicle is on and providing a safe steering function by the new SW at next key-on timing, even though the update of SW of the MDPS controller is not performed at key-off timing of the vehicle.

The system and method for controlling the update of SW of an MDPS apparatus can increase the update stability of new SW, can reduce an after sales service cost for the replacement of parts, and can reduce customer complaints because an MCU memory swap over the air (OTA) method that is rapidly changed into a method of downloading new SW while driving and swapping a dual memory embedded in the MCU simultaneously with the key off of a vehicle is used.

The system and method for controlling the update of SW of an MDPS apparatus can increase a driver's convenience because a driver can remotely confirm/control the update of SW of the MDPS controller by using a user terminal at key-off timing of a vehicle.

The apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method described herein. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A system for controlling an update of software (SW) of a motor-driven power steering (MDPS) apparatus, the system comprising:
a central communication controller configured to download a new version of the SW through wireless communication with a server located outside a vehicle; and
an MDPS controller comprising a first memory configured to store an old version of the SW and a second memory configured to store the new version of the SW, and the MDPS controller being configured to download the new version of the SW from the central communication controller and to perform an update of the new version of the SW by swapping the first memory and the second memory, wherein the MDPS controller comprises:
- a communication transceiver connected to the central communication controller through wired communication and configured to receive the new version of the SW from the central communication controller and store the new version of the SW in the second memory;
- a logic circuit unit configured to output a signal to turn on or off an operation of a power management unit based on any one or any combination of a vehicle key-on/off signal, a latch signal, and a first control signal from the communication transceiver;
- the power management unit configured to be activated, in response to receiving an operation-on signal from the logic circuit unit and being configured to supply driving power to a micro control unit (MCU) and to control an on or off of the latch signal; and
- the MCU comprising the first memory and the second memory and being configured to perform the update of the new version of the SW by swapping the first memory and the second memory.

2. The system of claim 1, wherein in response to the new version of the SW of the MDPS controller being updated in a state in which the vehicle is in a key-off state and a user of the vehicle is not present in the vehicle, the server is configured to
- notify a designated terminal of the user of the new version of the SW, and
- transmit a SW update command to the central communication controller, in response to receiving an update approval command from the user.

3. The system of claim 1, wherein the logic circuit unit is implemented by an OR gate.

4. The system of claim 1, wherein in response to a state of the vehicle being a key-on state,
- the MDPS controller is activated by a vehicle key-on signal, and
- the central communication controller is further configured to determine whether a new version of the SW of the MDPS controller has been registered with the server, download the new version of the SW from the server through wireless communication, in response to the new version of the SW having been registered with the server, and to transmit the new version of the SW to the MDPS controller through the wired communication.

5. A processor-implemented method of controlling an update of software (SW) of a motor-driven power steering (MDPS) apparatus, the method comprising:
- notifying, by a server, a terminal of a user of software update information, in response to new SW of an MDPS controller being available with a vehicle being in a key-off state and a user not being present in the vehicle;
- transmitting a SW update command to a central communication controller, in response to receiving an update approval command from the notified user;
- transmitting, by the central communication controller, a wakeup signal to the MDPS controller through wired communication;
- activating the MDPS controller based on power supplied, in response to the wakeup signal;
- transmitting, by the MDPS controller, a preparation-completed state message to the central communication controller;
- downloading, by the central communication controller, the new SW from the server through wireless communication and transmitting the new SW to the MDPS controller through wired communication;
- downloading, by the MDPS controller, the new SW to a second memory in which an old version of SW has not been stored and performing the update of the new SW by swapping a first memory in which an old version of SW has been stored and the second memory; and
- transmitting, by the MDPS controller, a new software update-completed signal to the central communication controller through wired communication and operating in a sleep mode, in response to the update of the new SW being completed.

6. The method of claim 5, wherein the transmitting of the wakeup signal to the MDPS controller comprises checking, by the central communication controller, a voltage state of a battery of the vehicle and transmitting the wakeup signal to the MDPS controller through wired communication, in response to a voltage of the battery being greater than or equal to a threshold.

7. The method of claim 5, wherein the transmitting of the preparation-completed state message to the central communication controller comprises:
- turning on, by a communication transceiver of the MDPS controller, a first switch connected to a battery, in response to receiving the wakeup signal from the central communication controller, the first switch being activated by power supplied from the battery;
- turning on a second switch connected to a logic circuit unit, and transmitting a first control signal for activating a power management unit to the logic circuit unit;
- transmitting, by the logic circuit unit, a power management unit operation-on signal to the power management unit, in response to receiving the first control signal;
- supplying, by the power management unit, driving power to a micro control unit (MCU), in response to being activated by the operation-on signal;
- activating the MCU by the driving power; and
- transmitting, by the MCU, a latch signal control-on command to the power management unit to continuously receive power even when the MCU is reset, and a preparation-completed state message to the central communication controller through the communication transceiver.

8. The method of claim 5, wherein the performing of the update of the new SW comprises configuring an MCU to
- download the new SW from the central communication controller to the second memory through a communication transceiver,
- check an integrity of the downloaded new SW,
- change an area of a main memory from the first memory to the second memory, in response to the integrity of the new SW being verified, and
- determine whether the new SW operates normally by performing initialization.

9. A processor-implemented method of controlling an update of software (SW) of a motor-driven power steering (MDPS) apparatus, the method comprising:
- activating an MDPS controller by a key-on signal, in response to a state of a vehicle being in a key-on state;
- determining, by a central communication controller, whether new SW of the MDPS controller has been registered with a server, downloading the new SW from the server through wireless communication in response to the new SW being registered with the server, and transmitting the new SW to the MDPS controller through wired communication;

downloading, by the MDPS controller, the new SW to a second memory in which an old version of SW has not been stored and checking updatable timing of the new SW, in response to an integrity of the new SW being verified;

performing, by the MDPS controller, an update of the new SW by swapping a first memory in which an old version of SW is stored and the second memory, in response to the updatable timing of the new SW being reached; and transmitting, by the MDPS controller, a new software update-completed signal to the central communication controller through wired communication and operating in a sleep mode, in response to the update of the new SW being completed.

10. The method of claim 9, wherein the activating of the MDPS controller by the key-on signal comprises
a logic circuit unit of the MDPS controller transmits a power management unit operation-on signal to a power management unit, in response to receiving a vehicle key-on signal,
activating the power management unit by the operation-on signal and supplying driving power to a micro control unit (MCU), and
activating the MCU by the supplied driving power, transmitting a latch signal control-on command to the power management unit to continuously receive the power even when the MCU is reset, and activating a communication transceiver.

11. The method of claim 9, wherein the transmitting of the new SW to the MDPS controller through the wired communication comprises transmitting, by the central communication controller, the new SW to the MDPS controller based on a wired communication network and a load factor of an MCU of the MDPS controller.

12. The method of claim 9, wherein the checking of the updatable timing of the new SW comprises determining, by the MDPS controller, corresponding timing as the updatable timing of the new SW in response to a software-updatable condition comprising at least one of a key-off state of the vehicle, an engine RPM "0", a vehicle speed "0", or a reception of an update approval command from a user is satisfied.

13. A system for controlling an update of software (SW) of a motor-driven power steering (MDPS) apparatus, the system comprising:
a central communication controller configured to download a new version of the SW through wireless communication with a server located outside a vehicle in response to a state of the vehicle being a key-on state and to transmit the new version of the SW to a motor-driven power steering (MDPS) controller through wired communication; and
the MDPS controller comprising a first memory configured to store an old version of the SW and a second memory configured to store the new version of the SW received from the central communication controller and perform an update of the new version of the SW by swapping the first memory and the second memory at updatable timing of the new version of the SW,
wherein the MDPS controller comprises:
a communication transceiver connected to the central communication controller through wired communication and configured to receive the new version of the SW from the central communication controller and to store the new version of the SW in the second memory;
a logic circuit unit configured to output a signal to turn on or off an operation of a power management unit based on any one or any combination of a vehicle key-on/off signal and a latch signal;
the power management unit configured to be activated, in response to receiving an operation-on signal from the logic circuit unit and being configured to supply driving power to a micro control unit (MCU) and to control an on or off of the latch signal; and
the MCU comprising the first memory and the second memory and being configured to perform the update of the new version of the SW by swapping the first memory and the second memory at the updatable timing of the new version of the SW.

14. The system of claim 13, wherein the central communication controller is further configured to
determine whether a new version of the SW of the MDPS controller has been registered with the server,
download the new version of the SW from the server through wireless communication if the new version of the SW has been registered with the server, and
transmit the new version of the SW to the MDPS controller through wired communication.

15. The system of claim 13, wherein:
the logic circuit unit is further configured to transmit a power management unit operation-on signal to the power management unit, in response to receiving the vehicle key-on signal or the latch signal "on" from the power management unit, and
the power management unit is further configured to be activated by the operation-on signal and to supply the driving power to the MCU, and, when receiving a latch signal control-on command from the MCU, transmits the latch signal "on" to the logic circuit unit to maintain an activation of the MDPS controller even though the key of the vehicle becomes off or the MCU is reset.

16. The system of claim 13, wherein the central communication controller or the MDPS controller are further configured to determine corresponding timing as the updatable timing of the new version of the SW, in response to a software-updatable condition comprising at least one of a key-off state of the vehicle, an engine RPM being "0", a vehicle speed being "0", or a reception of an update approval command from a user is satisfied.

17. A processor-implemented method of controlling an update of software (SW) of a motor-driven power steering (MDPS) apparatus, the method comprising:
activating an MDPS controller by a key-on signal, in response to a state of a vehicle being in a key-on state;
determining, by a central communication controller, whether new SW of the MDPS controller has been registered with a server, downloading the new SW from the server through wireless communication in response to the new SW having been registered with the server, and transmitting the new SW to the MDPS controller through wired communication;
downloading, by the MDPS controller, the new SW to a second memory in which an old version of the SW has not been stored and verifying an integrity of the downloaded new SW;
performing, by the MDPS controller, an update of the new SW by swapping a first memory in which an old version of the SW is stored and the second memory, in response to the integrity of the new SW being verified and updatable timing of the new SW being reached; and transmitting, by the MDPS controller, a new software update-completed signal to the central communication controller through wired communication and operating in a sleep mode, in response to the update of the new SW being completed.

18. The method of claim 17, wherein the activating of the MDPS controller by the key-on signal comprises:

transmitting, by a logic circuit unit of the MDPS controller, a power management unit operation-on signal to a power management unit, in response to receiving a vehicle key-on signal, activating the power management unit by the operation-on signal and supplying driving power to a micro control unit (MCU), and activating the MCU by the supplied driving power, and transmitting a latch signal control-on command to the power management unit to continuously receive the power even though the key of the vehicle becomes off or the MCU is reset.

19. The method of claim 17, wherein the transmitting of the new SW to the MDPS controller through the wired communication comprises transmitting, by the central communication controller, the new SW to the MDPS controller by considering a wired communication network and a load factor of an MCU within the MDPS controller.

20. The method of claim 17, wherein the performing of the update of the new SW comprises determining, by the MDPS controller, corresponding timing as the updatable timing of the new SW, in response to a software-updatable condition comprising at least one of a key-off state of the vehicle, an engine RPM "0", a vehicle speed "0", or a reception of an update approval command from a user being satisfied.

* * * * *